US010572715B2

(12) United States Patent
Hong et al.

(10) Patent No.: US 10,572,715 B2
(45) Date of Patent: Feb. 25, 2020

(54) SEGMENT BLOCK-BASED HANDWRITTEN SIGNATURE AUTHENTICATION SYSTEM AND METHOD

(71) Applicant: SECUVE CO., LTD., Seoul (KR)

(72) Inventors: Ki-Yoong Hong, Seoul (KR); Jun-Hee Shin, Seoul (KR)

(73) Assignee: SECUVE CO., LTD., Seoul (KR)

( * ) Notice: Subject to any disclaimer, the term of this patent is extended or adjusted under 35 U.S.C. 154(b) by 8 days.

(21) Appl. No.: 15/765,571

(22) PCT Filed: Oct. 5, 2016

(86) PCT No.: PCT/KR2016/011118
§ 371 (c)(1),
(2) Date: Apr. 3, 2018

(87) PCT Pub. No.: WO2017/061758
PCT Pub. Date: Apr. 13, 2017

(65) Prior Publication Data
US 2019/0065822 A1     Feb. 28, 2019

(30) Foreign Application Priority Data
Oct. 5, 2015   (KR) .................. 10-2015-0139928

(51) Int. Cl.
*G06K 9/00*     (2006.01)
*G06F 3/041*    (2006.01)
(Continued)

(52) U.S. Cl.
CPC ......... *G06K 9/00161* (2013.01); *G06F 3/041* (2013.01); *G06F 3/0488* (2013.01);
(Continued)

(58) Field of Classification Search
CPC .......... G06K 9/00161; G06K 9/00926; G06K 9/4604; G06K 9/4642; G06K 9/50;
(Continued)

(56) References Cited

U.S. PATENT DOCUMENTS 4,903,313 A * 2/1990 Tachikawa ............... G06K 9/48
382/171
5,239,592 A * 8/1993 Kameyama ............ G06K 9/32
382/138
(Continued)

FOREIGN PATENT DOCUMENTS

KR   1020020064574   8/2002
KR   1020090058145   6/2009
(Continued)

*Primary Examiner* — Xuemei G Chen
(74) *Attorney, Agent, or Firm* — Studebaker & Brackett PC

(57) ABSTRACT

Provided is a segment-block-based handwritten signature authentication system and a method thereof, and more particularly, to a handwritten signature authentication system and a method thereof that enrolls a handwritten signature including handwritten signature characteristics information based on segment blocks disjointed by a user, acquires segment-block-based handwritten signature characteristics information from the handwritten signature upon request for handwritten signature authentication, and performs handwritten signature authentication by comparing the pre-enrolled handwritten signature characteristics information based on segments and the acquired handwritten signature characteristics information.

7 Claims, 12 Drawing Sheets

(51) Int. Cl.

| | |
|---|---|
| *G06F 3/0488* | (2013.01) |
| *G06F 21/31* | (2013.01) |
| *G06T 7/11* | (2017.01) |
| *G06F 21/32* | (2013.01) |
| *G06K 9/46* | (2006.01) |
| *G06K 9/50* | (2006.01) |
| *G06K 9/62* | (2006.01) |
| *G06T 7/13* | (2017.01) |
| *G06T 7/70* | (2017.01) |
| *G06K 9/60* | (2006.01) |

(52) U.S. Cl.
CPC .......... *G06F 3/04883* (2013.01); *G06F 21/31* (2013.01); *G06F 21/32* (2013.01); *G06K 9/00174* (2013.01); *G06K 9/00194* (2013.01); *G06K 9/00926* (2013.01); *G06K 9/4604* (2013.01); *G06K 9/4642* (2013.01); *G06K 9/50* (2013.01); *G06K 9/6201* (2013.01); *G06T 7/11* (2017.01); *G06K 9/60* (2013.01); *G06K 2009/6213* (2013.01); *G06T 7/13* (2017.01); *G06T 7/70* (2017.01); *G06T 2207/20021* (2013.01)

(58) Field of Classification Search
CPC .......... G06K 9/6201; G06K 9/00; G06K 9/60; G06K 9/00194; G06K 9/00174; G06K 2009/6213; G06F 3/04883; G06F 21/32; G06F 3/0488; G06F 21/31; G06F 3/041; G06T 7/13; G06T 7/11; G06T 7/70; G06T 2207/20021
See application file for complete search history.

(56) References Cited

U.S. PATENT DOCUMENTS

| | | | | |
|---|---|---|---|---|
| 5,647,017 A | * | 7/1997 | Smithies | G06K 9/00154 |
| | | | | 382/119 |
| 5,745,598 A | * | 4/1998 | Shaw | G06K 9/00154 |
| | | | | 382/119 |
| 6,144,764 A | * | 11/2000 | Yamakawa | G06K 9/00429 |
| | | | | 382/187 |
| 6,160,914 A | * | 12/2000 | Muroya | G06K 9/00154 |
| | | | | 382/120 |
| 6,563,939 B1 | * | 5/2003 | Chai | G06K 9/00154 |
| | | | | 382/119 |
| 6,618,504 B1 | * | 9/2003 | Yoshino | G06K 9/00449 |
| | | | | 382/187 |
| 6,694,056 B1 | * | 2/2004 | Ito | G06K 9/222 |
| | | | | 382/186 |
| 9,704,081 B2 | * | 7/2017 | Tanaka | G06K 7/1417 |
| 10,095,851 B2 | * | 10/2018 | Seo | G06F 21/32 |
| 2001/0056410 A1 | * | 12/2001 | Ishigaki | G06Q 20/04 |
| | | | | 705/67 |
| 2003/0182585 A1 | * | 9/2003 | Murase | G06F 21/32 |
| | | | | 726/3 |
| 2005/0091500 A1 | * | 4/2005 | Okazaki | G06K 9/00154 |
| | | | | 713/176 |
| 2005/0105781 A1 | * | 5/2005 | Sakamoto | G06K 9/00154 |
| | | | | 382/119 |
| 2007/0188793 A1 | * | 8/2007 | Wakai | G06K 9/00161 |
| | | | | 358/1.14 |
| 2010/0283766 A1 | * | 11/2010 | Shieh | G06F 3/03545 |
| | | | | 345/179 |
| 2014/0363083 A1 | * | 12/2014 | Xia | G06F 3/018 |
| | | | | 382/189 |
| 2017/0004122 A1 | * | 1/2017 | Taniguchi | G06K 9/00416 |
| 2017/0286749 A1 | * | 10/2017 | Tanaka | G06F 21/64 |

FOREIGN PATENT DOCUMENTS

| | | |
|---|---|---|
| KR | 1020120047973 | 5/2012 |
| KR | 1012334240000 | 2/2013 |
| KR | 1020150041569 | 4/2015 |

* cited by examiner

SEGMENT BLOCK-BASED HANDWRITTEN SIGNATURE AUTHENTICATION SYSTEM AND METHOD

BACKGROUND

The present invention relates to a handwritten signature authentication system and a method thereof, and more particularly, to a handwritten signature authentication system and a method thereof using a user's handwritten signature characteristics information based on segment blocks including segments disjointed by a user's signing behavior.

The development of application-based smart devices (e.g. smartphones, smart pads, etc.) and the advancement of mobile and Internet communications technology have made it possible to access various services conveniently and readily through the Internet or applications.

Many such services require user authentication to prevent a third party from using the services by stealing the user's identity.

While in the offline environment, user authentication can be performed with the user's identification card or driver's license on a face-to-face basis, in the online environment, where the service provider does not come into contact with users, different methods of user authentication are needed.

For this reason, a variety of technologies have been developed and applied to verify the user's identity of the personal information entered for use of the services.

The most commonly used technologies for user authentication are the ones using Short Message Service (SMS), Automatic Response System (ARS), and digital signatures (electronic signatures).

User authentication via SMS involves sending an SMS message with an authentication code to the user's mobile device, namely a mobile (cell) phone or smartphone, and requiring the user to enter the code into the mobile website or mobile application on the device. User authentication is completed when the code registered for the device and the code entered into the device match each other.

In using the above technologies, however, there is a risk of identity theft in case of the loss of the device or leakage of personal information.

Therefore, there is a trend toward hybrid methods that employ two or more of the above technologies to enhance user security, which is increasing demand for additional technologies for more accurate user authentication.

Handwritten signature authentication is a case in point, which considers individual characteristics of each user.

Handwritten signature authentication technologies include an image comparison method by examining a match rate of the handwritten signature image, and a behavioral characteristics data comparison method by examining a match rate of the handwritten signature behavioral characteristics.

There are many cases where a handwritten signature authentication system employing the image comparison method allows a third party to steal the user's identity if the third party copies the user's signature image, and the system concludes the two signatures match.

Because of this drawback, the behavioral characteristics comparison method is preferred in a handwritten signature authentication system.

A handwritten signature authentication system employing the behavioral characteristics data comparison method performs handwritten signature authentication by extracting and storing the characteristics of the user's signature patterns, such as pressure, speed, intersection points, and inflection point angles. However, the behavioral characteristics comparison method also often leads to cases where a third party copies the behavioral characteristics to some extent when copying a handwritten signature image. In some cases, the traditional handwritten signature authentication system determines that two signatures match on the basis of similar behavioral characteristics even when the images of the two signatures are completely different.

Accordingly, there is a demand for a method for a handwritten signature authentication system that can distinguish handwritten signatures more accurately, thereby enhancing security with higher levels of handwritten signature recognition and authentication accuracy.

SUMMARY OF THE INVENTION

The present invention provides a segment-block-based handwritten signature authentication system and a method thereof that enrolls a handwritten signature by storing handwritten signature characteristics information based on segment blocks of segments disjointed by a user when writing a handwritten signature, acquires segment-block-based handwritten signature characteristics information from the handwritten signature written by the user upon request for handwritten signature authentication, and performs a segment-based handwritten signature authentication by conducting a comparison between the pre-enrolled handwritten signature characteristics information based on the segment blocks and the acquired handwritten signature characteristics information based on the segment blocks.

In order to accomplish the above object, the present invention provides a segment-block-based handwritten signature authentication system, the system including: a handwritten signature input unit that includes a touch input unit that outputs touch data, as a handwritten signature input data, including position data and pressure data with respect to positions that are touched by a signer for handwritten signature; an enrollment unit that enrolls handwritten signature characteristics information of each signer; and a handwritten signature authentication unit that generates a handwritten signature image and segment images by identifying a handwritten signature of the signer and recognizing segments disjointed by the signer from the handwritten signature input data entered from the handwritten signature input unit, generates both a handwritten signature block including the handwritten signature and segment blocks containing the segments, collects handwritten signature characteristics information ($\Sigma$) including each segment block information, handwritten signature block information, correlation information between the segment blocks, and correlation information between each segment block and the handwritten signature block, maps the collected handwritten signature characteristics information to identification information of the signer, enrolls the collected handwritten signature characteristics information in the enrollment unit, collects handwritten signature characteristics information ($\Sigma$) including correlation information between the segment blocks and correlation information between each segment block and the handwritten signature block from the touch data entered through the touch input unit of the handwritten signature input unit upon request for handwritten signature authentication, loads the enrolled handwritten signature characteristics information ($\Sigma'$) that corresponds with the identification information of the signer who requests handwritten signature authentication, and performs a segment-block-based handwritten signature authentication according to a match rate by comparing the enrolled handwritten signature characteristics information (Σ') with the collected handwritten signature characteristics information (Σ).

The handwritten signature authentication unit may include: a handwritten signature characteristics extraction unit that extracts the handwritten signature characteristics information (Σ) including overall handwritten signature block characteristics information (Q) which is characteristics information of the handwritten signature block that includes the handwritten signature image, overall segment block characteristics information (V) which is characteristics information on the handwritten signature segments that constitute the handwritten signature, and block correlation characteristics information (C) caused by the correlations between the segment blocks and the correlations between each segment block and the handwritten signature block, from the handwritten signature input data entered from the touch input unit of the handwritten signature input unit; a handwritten signature segment block authentication unit that performs handwritten signature authentication according to each predetermined match rate by comparing the handwritten signature characteristics information (Σ) extracted from the handwritten signature characteristics extraction unit with the pre-enrolled handwritten signature characteristics information (Σ'); and a control unit that saves and enrolls the handwritten signature characteristics information, as extracted through the handwritten signature characteristics extraction unit, to the enrollment unit at time of request for enrollment, and performs handwritten signature authentication by controlling the handwritten signature segment block authentication unit at time of request for handwritten signature authentication.

The handwritten signature characteristics extraction unit may include: a handwritten signature start detection unit that detects the start of a handwritten signature from the touch data; a handwritten signature end detection unit that detects the end of a handwritten signature designating a final touch data input point as an end point of the handwritten signature when there is no touch data input for a certain period of time; a segment detection unit that detects the segments disjointed by handwriting the signature from the touch data, and generates and outputs segment images of the detected segments; a segment count unit that counts the number of the segments detected in the segment detection unit; a segment block characteristics detection unit that receives the segment images as input, creates each segment block ($s_i$) including the corresponding segment image, generates each segment block characteristics information ($v_i$) on the created segment block ($s_i$), and generates and outputs overall segment block characteristics information (V) including all of the generated segment block characteristics information ($v_i$); an overall handwritten signature block characteristics detection unit that creates a handwritten signature block (S) including the acquired handwritten signature image, and generates and outputs overall handwritten signature block characteristics information (Q) on the handwritten signature block (S); a segment block correlation detection unit that generates and outputs the block correlation characteristics information (C) according to the correlations between the segment blocks and the correlations between the overall handwritten signature block and each segment block; and a handwritten signature characteristics acquisition unit that includes a handwritten signature block characteristics information generation unit that generates and outputs handwritten signature characteristics information (Σ) including the overall handwritten signature block characteristics information (Q), the overall segment block characteristics information (V), and the block correlation characteristics information (C).

The overall handwritten signature block characteristics detection unit may further generate and output overall handwritten signature block space information ($SPACE_S$) by calculating space area of the handwritten signature block (S), and wherein the segment block characteristics detection unit may include: a segment block generation unit that receives the segment images as input, and generates and outputs the segment block ($s_i$) including the corresponding segment image; a segment block edge position detection unit that receives the segment block ($s_i$) as input, and detects and outputs segment block position information ($p_i$), which is information on all edges of the segment block; a segment block space characteristics detection unit that receives at least one of the segment block ($s_i$) and the segment block position information ($p_i$), and generates and outputs segment block space information ($space_{s_i}$) by calculating the space area of the segment block ($s_i$); a space ratio characteristics detection unit that receives the overall handwritten signature block space information ($SPACE_S$) and the segment block space information ($space_{s_i}$) from the overall handwritten signature block characteristics detection unit, and generates and outputs segment block space ratio information ($\Delta_i$) by calculating a ratio of the space area of the segment block against the overall handwritten signature block space; and a segment block characteristics information generation unit that generates, for each segment of handwritten signature, the segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

The block is a polygon and wherein the segment block generation unit generates a polygon segment block surrounding a segment by passing through the top, bottom, leftmost, and rightmost points of the segment.

The overall handwritten signature block characteristics detection unit may further generate and output the overall handwritten signature block space information ($SPACE_S$) by calculating space area of the handwritten signature block (S) and wherein the segment block correlation detection unit may include: an intersection space detection unit that detects any adjacent segment block ($s_j$) having a relation of inclusion or intersection with each segment block ($s_i$), and outputs, if any, intersection space information ($\delta_{ij}$) by calculating space area of inclusion or intersection; an intersection space ratio detection unit that receives the overall handwritten signature block space information ($SPACE_S$), the segment block space information ($space_{s_i}$), and the intersection space information ($\delta_{ij}$) as input, generates handwritten signature block intersection space ratio information ($r_{ij}$) by calculating a ratio of the intersection space ($\delta_{ij}$) against the overall handwritten signature block space ($SPACE_S$), generates segment block intersection space ratio information ($\pi'_{ij}$) by calculating a ratio of the intersection space ($\delta_{ij}$) against the segment block space ($space_{s_i}$), and generates adjacent segment block intersection space ratio information ($\pi''_{ij}$) by calculating a ratio of the intersection space ($\delta_{ij}$) against the adjacent segment block space ($SPACEs_j$); a segment block inclusion relation detection unit that generates and outputs segment block inclusion relation information ($O_{ij}$), which shows whether an adjacent segment block ($s_j$) is included in or intersects with a segment block ($s_i$); a segment positional relation detection unit that generates and outputs segment block positional relation information ($POS_{ij}$) representing relative position on all adjacent segment blocks ($s_j$) based on a segment block ($s_i$); an edge positional relation detection unit that generates and outputs segment block edge positional relation information ($EDGE_{ij}$) representing relative edge position at which edge of a segment block ($s_i$) intersects with all adjacent segment blocks ($s_j$); and a correlation characteristics information generation unit that generates and outputs block correlation characteristics information (C) including the intersection space information ($\delta_{ij}$), the handwritten signature block intersection space ratio information ($r_{ij}$), the segment block intersection space ratio information ($\pi'_{ij}$), the adjacent segment block intersection space ratio information ($\pi''_{ij}$), the segment block inclusion relation information ($O_{ij}$), the segment block positional relation information ($POS_{ij}$), and the segment block edge positional relation information ($EDGE_{ij}$).

In order to accomplish the above objects, the present invention provides a segment-block-based handwritten signature authentication method, the method including: an enrollment process in which a handwritten signature authentication unit generates a handwritten signature image and segment images by identifying a handwritten signature of a signer and recognizing segments disjointed by the signer from the handwritten signature input data entered from the handwritten signature input unit, generates both a handwritten signature block including the handwritten signature and segment blocks containing the segments, collects handwritten signature characteristics information ($\Sigma$) including each segment block information, handwritten signature block information, correlation information between the segment blocks, and correlation information between each segment block and the handwritten signature block, maps the collected handwritten signature characteristics information to identification information of the signer, and enrolls the collected handwritten signature characteristics information in the enrollment unit; and a handwritten signature authentication process in which the handwritten signature authentication unit collects handwritten signature characteristics information ($\Sigma$) including correlation information between the segment blocks and correlation information between each segment block and the handwritten signature block from the touch data entered through the touch input unit of the handwritten signature input unit upon request for handwritten signature authentication, loads the enrolled handwritten signature characteristics information ($\Sigma'$) that corresponds with the identification information of the signer who requests handwritten signature authentication, and performs a handwritten signature authentication according to a match rate by comparing the enrolled handwritten signature characteristics information ($\Sigma'$) with the collected handwritten signature characteristics information ($\Sigma$).

The handwritten signature enrollment process may include: an enrollment request monitoring step that monitors whether handwritten signature enrollment is made; a signer identification information acquisition step that acquires the signer identification information to be enrolled upon request for handwritten signature enrollment; a handwritten signature characteristics information acquisition step that acquires the handwritten signature characteristics information ($\Sigma$) from touch data entered through the touch input unit regarding to the handwritten signature of the signer; and a handwritten signature enrollment step that maps the handwritten signature characteristics information to the identification information of the signer and enrolls the handwritten signature characteristics information in the enrollment unit.

The handwritten signature authentication process may include: a handwritten signature authentication request monitoring step that monitors whether handwritten signature authentication is made; a signer identification information acquisition step that acquires the signer identification information upon request for handwritten signature authentication; a handwritten signature characteristics information acquisition step that acquires the handwritten signature characteristics information ($\Sigma$) from touch data entered from the touch input unit regarding to the handwritten signature of the signer; an enrolled handwritten signature characteristics information loading step that loads the pre-enrolled handwritten signature characteristics information ($\Sigma'$) corresponding with the acquired signer identification information; and a handwritten signature authentication step that performs handwritten signature authentication by comparing the acquired handwritten signature characteristics information ($\Sigma$) with the enrolled handwritten signature characteristics information ($\Sigma'$) as loaded and outputs a result of the authentication.

The handwritten signature characteristics information ($\Sigma$) acquisition step may include: a handwritten signature tracking step that begins tracking the handwritten signature from the touch data of the handwritten signature input data entered from the handwritten signature input unit; a segment detection step that detects handwritten signature segments disjointed by the signer from the touch data through a segment detection unit, and generates and outputs segment images of the detected segments when the handwritten signature tracking step begins; a segment count step that counts the number of the segments detected from the segment detection unit; a segment block characteristics detection step that receives the segment image as input, creates each segment block ($s_i$) including the corresponding segment image, and generates and outputs each segment block characteristics information ($v_i$) on the created segment block ($s_i$); an overall handwritten signature block characteristics detection step that creates a handwritten signature block (S) including the acquired handwritten signature image, and generates and outputs overall handwritten signature block characteristics information (Q) on the handwritten signature block (S); a segment block correlation detection step that generates and outputs block correlation characteristics information (C) according to the correlations between the segment blocks and the correlations between the overall handwritten signature block and each segment block; and a handwritten signature block characteristics information generation step that generates overall segment block characteristics information (V) including segment block characteristics information ($v_i$) on all segments, and generates and outputs handwritten signature characteristics information ($\Sigma$) including the overall handwritten signature block characteristics information (Q), the overall segment block characteristics information (V), and the block correlation characteristics information (C).

The overall handwritten signature block characteristics detection step may further generate and output overall handwritten signature block space information ($SPACE_S$) by calculating space area of the handwritten signature block (S) and the segment block characteristics detection step may include: a segment block generation step that receives the segment images as input, and generates and outputs the segment block ($s_i$) including the corresponding segment image; a segment block edge position detection step that receives the segment block ($s_i$) as input, and detects and outputs segment block position information ($p_i$), which is position information on all edges of the segment block; a segment block space characteristics detection step that receives at least one of the segment block ($s_i$) and the segment block position information ($p_i$), and generates and outputs segment block space information (space$_{s_i}$) by calculating the space area of the segment block (s$_i$); a space ratio characteristics detection step that receives the segment block space information (space$_{s_i}$) the overall handwritten signature block space information (SPACE$_S$) detected from the overall handwritten signature block characteristics detection unit, and generates and outputs segment block space ratio information (Δ$_i$) by calculating a ratio of the space area of the segment block (space$_{s_j}$) against the overall handwritten signature block space (SPACE$_S$); and a segment block characteristics information generation step that generates, for each segment of handwritten signature, segment block characteristics information (v$_i$) including the segment block position information (p$_i$), the segment block space information (space$_{s_i}$), and the segment block space ratio information (Δ$_i$), and generates and outputs the overall segment block characteristics information (V) on all segments of the entire handwritten signature.

The block is a polygon, and the segment block generation unit, in the segment block generation step, generates a polygon segment block surrounding a segment by passing through the top, bottom, leftmost, and rightmost points of the segment.

The overall handwritten signature block characteristics detection step may further generate and output the overall handwritten signature block space information (SPACE$_S$) by calculating space area of the handwritten signature block (S), and the segment block correlation detection step may include: an intersection space detection step that detects any adjacent segment block (s$_j$) having a relation of inclusion or intersection with each segment block (s$_i$), and outputs, if any, intersection space information (δ$_{ij}$) by calculating space area of inclusion or intersection; an intersection space ratio detection step that receives the overall handwritten signature block space information (SPACE$_S$), the segment block space information (space$_{s_i}$), and the intersection space information (δ$_{ij}$) as input, generates handwritten signature block intersection space ratio information (r$_{ij}$) by calculating a ratio of the intersection space (δ$_{ij}$) against the overall handwritten signature block space (SPACE$_S$), generates segment block intersection space ratio information (π'$_{ij}$) by calculating a ratio of the intersection space (δ$_{ij}$) against the segment block space (space$_{s_i}$), and generates adjacent segment block intersection space ratio information (π"$_{ij}$) by calculating a ratio of the intersection space (δ$_{ij}$) against the adjacent segment block space (SPACEs$_j$); a segment block inclusion relation detection step that generates and outputs segment block inclusion relation information (O$_{ij}$), which shows whether an adjacent segment block (s$_j$) is included in or intersects with a segment block (s$_i$); a segment positional relation detection step that generates and outputs segment block positional relation information (POS$_{ij}$), representing relative position on all adjacent segment blocks (s$_j$) based on a segment block (s$_i$); an edge positional relation detection step that generates and outputs segment block edge positional relation information (EDGE$_{ij}$) representing relative edge position at which edge of a segment block (s$_i$) intersects with all adjacent segment block (s$_j$); and a correlation characteristics information generation step that generates and outputs block correlation characteristics information (C) including the intersection space information (δ$_{ij}$), the handwritten signature block intersection space ratio information (r$_{ij}$), the segment block intersection space ratio information (π'$_{ij}$), the adjacent segment block intersection space ratio information (π"$_{ij}$), the segment block inclusion relation information (O$_{ij}$), the segment block positional relation information (POS$_{ij}$), and the segment block edge positional relation information (EDGE$_{ij}$).

The present invention performs handwritten signature authentication by recognizing segments disjointed by the signer while handwriting a signature and performing handwritten signature authentication based on the following information: the characteristics of segment blocks including the segments and the overall handwritten signature block; correlation information between the segment blocks; and correlation information between each segment block and the overall handwritten signature block. Therefore, the present invention enables to perform handwritten signature authentication based specifically on the segment blocks and improve the recognition rate of handwritten signature.

DETAILED DESCRIPTION OF THE INVENTION

The configuration and operation of the segment-block-based handwritten signature authentication system according to the present invention and the segment-block-based handwritten signature authentication method in the system will be described hereinafter with reference to the accompanying drawings.

A handwritten signature segment (referred to as a 'segment' hereinafter) in the present invention means a part of a handwritten signature disjointed by the signer while signing the handwritten signature. Therefore, the number of segments (n) may be, for example, 1, 2, 3, or 4 depending on the signer, even if the signer tries to write the same signature. Similarly, the correlations between the segments will also differ as the positions and lengths of the segments vary depending on the signer even if the signer tries to write the same signature.

Furthermore, a segment block in the present invention means a polygonal block that includes segments, and the polygonal block can represent a block that is formed following a rule that is consistently applied to all segments. For example, if the polygonal block is a rectangle, the rectangular block may be formed by lines passing through all of the top ($top_i$), bottom ($bottom_i$), leftmost ($left_i$) and rightmost ($right_i$) points (i means the index of a segment, i=0, 1, 2, 3 . . . n−1) with the minimum space possible.

Figure 1:
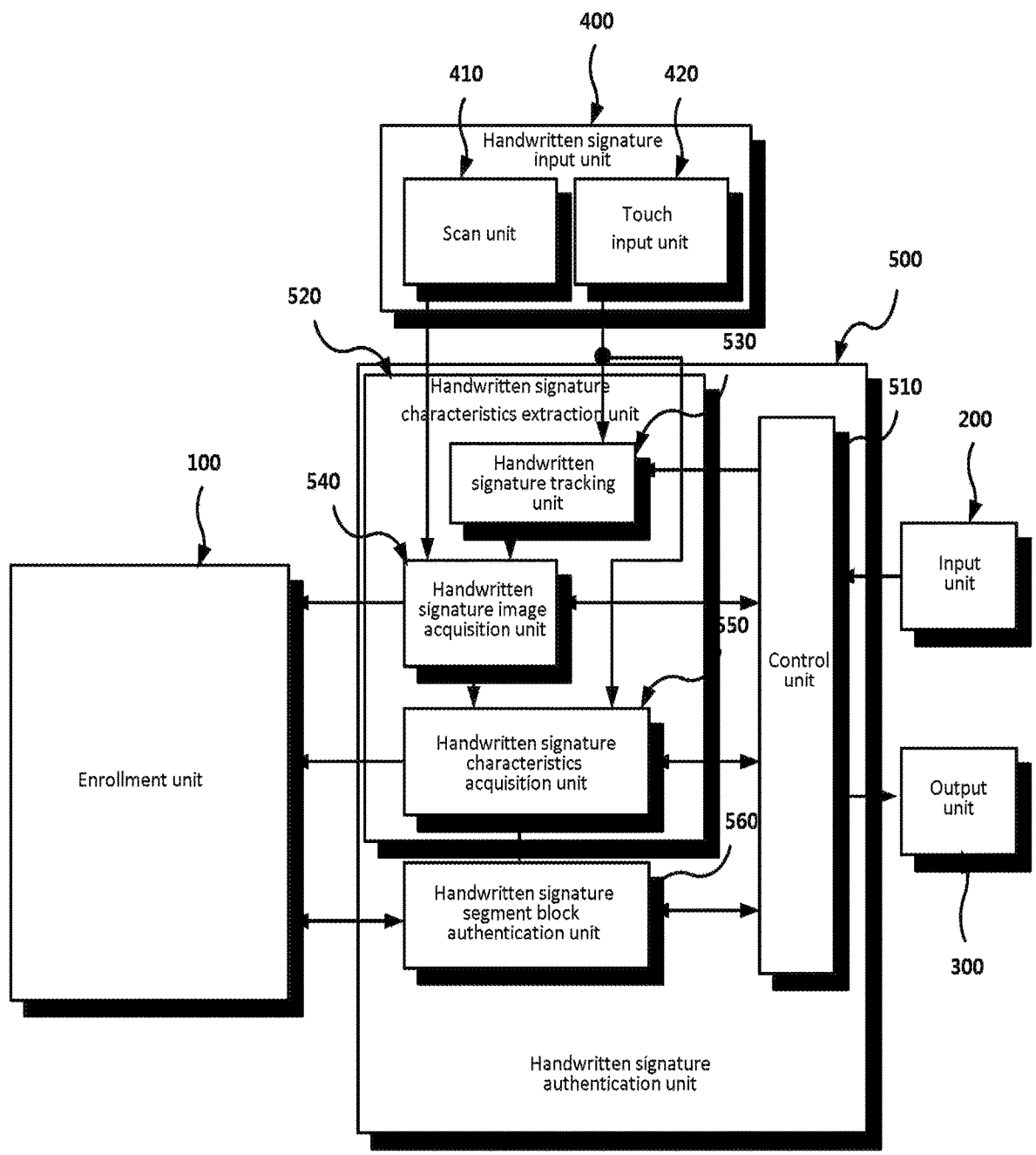
FIG. 1 is a diagram illustrating a configuration of a segment-block-based handwritten signature authentication system according to the present invention.

FIG. 1 is a diagram illustrating a configuration of a segment-block-based handwritten signature authentication system according to the present invention.

Referring to FIG. 1, a segment-block-based handwritten signature authentication system according to the present invention includes an enrollment unit 100, a handwritten signature input unit 400, and a handwritten signature authentication unit 500, and further includes an input unit 200 and an output unit 300 according to the exemplary embodiment of the present invention.

The enrollment unit 100 may be set up in a variety of storage media, including the hard drives of personal computers (PCs) or laptops, portable hard drives, such as universal serial bus (USB) devices, security tokens, subscriber identification module (SIM) cards embedded in mobile devices, such as cell phone or smartphones, micro SD cards in mobile devices, TrustZone in mobile devices, and online hard drives, and the enrollment unit stores handwritten signature characteristics information ($\Sigma$).

The handwritten signature characteristics information ($\Sigma$) includes overall handwritten signature block characteristics information (Q), overall segment block characteristics information (V), and block correlation characteristics information (C). Detailed information included in these types of information will be described more fully with reference to FIG. 2 through FIG. 5 below.

The input unit 200 may be a key input device that has numerous keys generating multiple commands and outputs key data (key signals) on pressed keys, a touchpad that also functions as a screen and outputs position data on touch points, and a receiver that receives data from an external device through wire and wireless communications. The input unit 200 sends commands, such as handwritten signature enrollment commands and handwritten signature authentication commands upon request of a user to the handwritten signature authentication unit 500. If the handwritten signature authentication unit is configured in the form of a server, the input unit 200 may also be a point-of-sale (POS) terminal, payment terminal, or mobile communication terminal from a remote place.

If the handwritten authentication unit 500 is configured in a mobile communication terminal, the output unit 300, which outputs a handwritten signature image, handwritten signature characteristics information, and handwritten signature authentication result acquired from the handwritten authentication unit 500, can be a display device, such as a liquid crystal display (LCD). If the handwritten signature authentication unit 500 is configured on a server, the server may be a message sending server that sends handwritten signature authentication results via mobile messages, such as Short Message Service (SMS), Long Message Service (LMS), and Multimedia Message Service (MMS) messages, an application server that sends push notifications, an email server, or a mobile communication terminal that displays the received authentication results.

The handwritten signature input unit 400 is configured in a terminal unit that receives a handwritten signature, such as a PC, mobile communication terminal, POS terminal, or payment terminal owned by the user or service provider, or connected to a separate device and outputs handwritten signature input data to acquire an image of the handwritten signature written by the user and may include at least one of a scan unit 410 and a touch input unit 420. It is recommended, however, to ensure that it includes a touch input unit 420 as it should receive input of a signature in a handwritten form. The touch input unit 420 may be a touchpad, touchscreen, or smart pen, which enables to track a handwritten signature and collect image characteristics information of both handwritten signature and segments, and behavioral characteristics information.

The scan unit 410 scans the paper on which a signature is handwritten and sends the scanned data to the handwritten signature authentication unit 500.

The touch input unit 420 may be a touchpad or a touchscreen and sends touch data that includes continuous position data and pressure data on a signature handwritten by a user to the handwritten signature authentication unit 500 as input data.

The handwritten signature authentication unit 500 includes a control unit 510, a handwritten signature characteristics extraction unit 520, and a handwritten signature segment block authentication unit 560.

The handwritten signature authentication unit 500 may be configured based on an application in a mobile communication terminal or a computer, based on an application or a web server in a server, or in the form of firmware in a POS or payment terminal. The configuration of an application server, web server, and firmware based on an application, firmware, or web server according to the present invention will not be further described in detail as it is obvious to those skilled in the art.

To describe the configuration and operation of the handwritten signature authentication unit 500 in more detail, the control unit 510 controls the overall operation of the handwritten signature authentication unit 500. Particularly, the control unit 510 determines whether a command received from the input unit 200 is for handwritten signature enrollment or authentication, controls the operation of enrollment or authentication depending on the command, and sends the control results to the output unit 300.

The handwritten signature characteristics extraction unit 520 detects and outputs segment-block-based handwritten signature characteristics information ($\Sigma$) from handwritten signature input data through the touch input unit 420 of the handwritten signature input unit 400.

Specifically, the handwritten signature characteristics extraction unit 520 includes a handwritten signature tracking unit 530, a handwritten signature image acquisition unit 540, and a handwritten signature characteristics acquisition unit 550.

The handwritten signature tracking unit 530 detects continuous position data from touch data output from the touch input unit 420 of the handwritten signature input unit 400 and sends it to an image acquisition unit 540.

The handwritten signature image acquisition unit 540 receives scan data from the handwritten signature input unit 400 and position data from the handwritten signature tracking unit 530, and acquires and outputs a handwritten signature image from scan data or positional data.

The handwritten signature image acquisition unit 540 may acquire a tracked handwritten signature image from the scan unit 410 or generate a tracked handwritten signature image by tracking position data input in real time through the touch input unit 420 or handwritten signature tracking unit 530.

The handwritten signature characteristics acquisition unit 550 receives touch data entered continuously from the touch input unit 420 of the handwritten signature input unit 400, identifies handwritten signature segments disjointed by the signer while signing based on position and pressure data of the touch data, counts the number (n) of the identified segments, and generates images of the identified segments.

In addition, the handwritten signature characteristics acquisition unit 550 generates polygonal (the following description will be based on the supposition that a polygon is a 'rectangle') blocks (referred to as 'segment blocks' hereinafter) for each of the generated handwritten signature segment image, extracts overall segment block characteristics information (V) on the generated segment blocks, generates an overall handwritten signature block for the entire handwritten signature image entered from the handwritten signature image acquisition unit 540 or acquired by itself, generates overall handwritten signature block characteristics information (Q) on the overall handwritten signature block, generates block correlation characteristics information (C) based on correlations between the blocks, and generates and outputs handwritten signature characteristics information (Σ) that includes the generated overall segment block characteristics information (V), overall handwritten signature block characteristics information (Q), and block correlation characteristics information (C), as shown in Equation 1 below.

$$\Sigma = \{V, Q, C\} \quad \text{[Equation 1]}$$

The configuration of handwritten signature characteristics acquisition unit 550 will be described in more detail with reference to FIGS. 2, 3, and 5 below.

The handwritten signature segment block authentication unit 560, following a command for handwritten signature authentication from the control unit 510, receives the identification information of the signer from the handwritten signature input unit 400 and handwritten signature characteristics information (Σ) from the handwritten signature characteristics extraction unit 520, loads pre-enrolled handwritten signature characteristics information (Σ') corresponding with the signer identification information from the enrollment unit 100, and performs handwritten signature authentication by comparing the loaded pre-enrolled handwritten signature characteristics information (Σ') and the handwritten signature characteristics information (Σ) entered from the handwritten signature characteristics extraction unit 520 and determining whether the match rate reaches a certain level.

To be more specific, the handwritten signature segment block authentication unit 560 performs handwritten signature authentication by conducting comparison between enrolled overall handwritten signature block characteristics information (Q') of the loaded enrolled handwritten signature characteristics information (Σ') and overall handwritten signature block characteristics information (Q) of the handwritten signature characteristics information (Σ) extracted by the handwritten signature characteristics extraction unit 520, between enrolled overall segment block characteristics information (V') and extracted overall segment block characteristics information (V), and between loaded enrolled block correlation characteristics information (C') and extracted block correlation characteristics information (C) and then determining whether the match rates reach a certain level.

Figure 2:
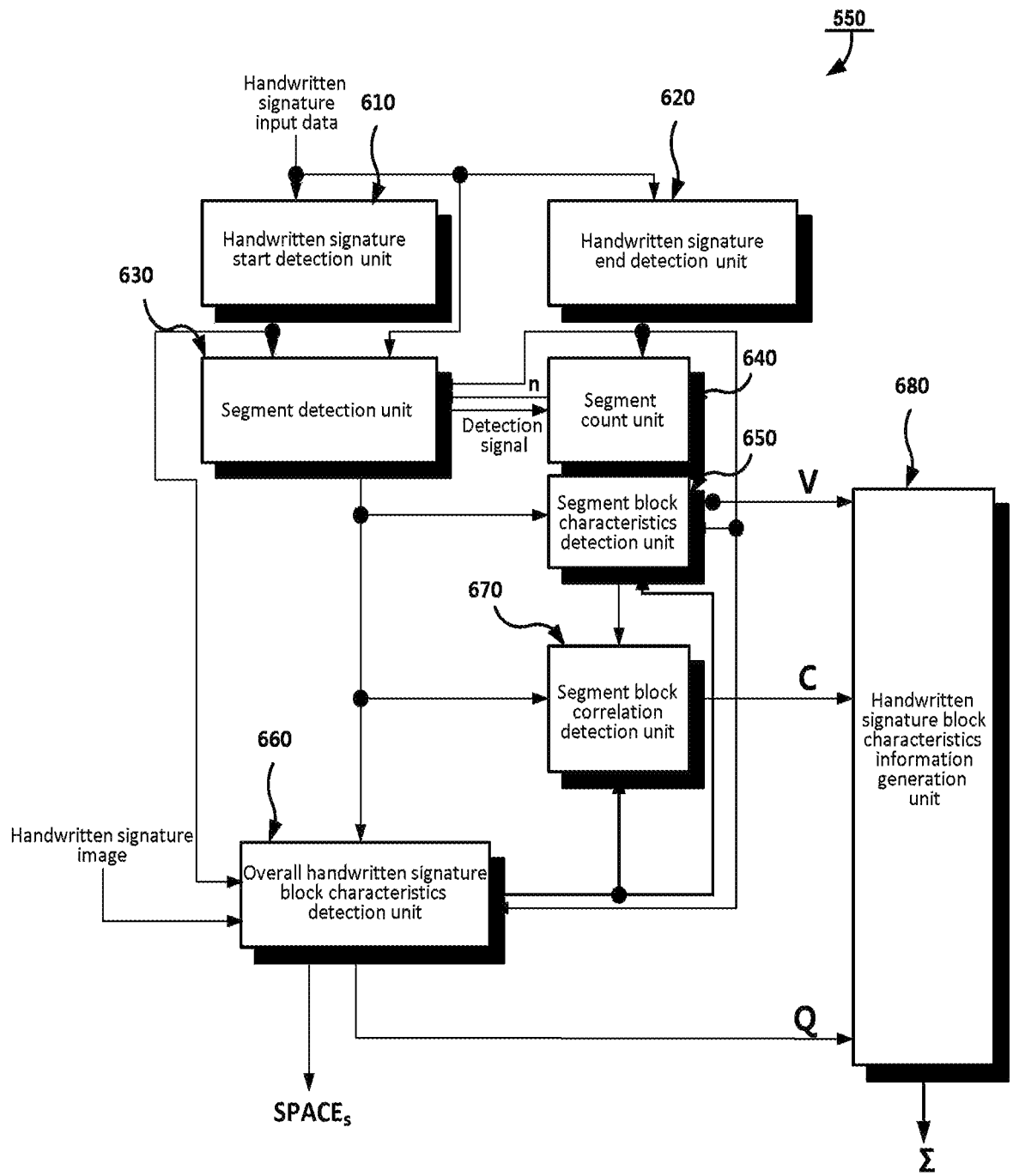
FIG. 2 is a diagram illustrating a configuration of a handwritten signature characteristics acquisition unit of a segment-block-based handwritten signature authentication system according to the present invention.
Figure 3:
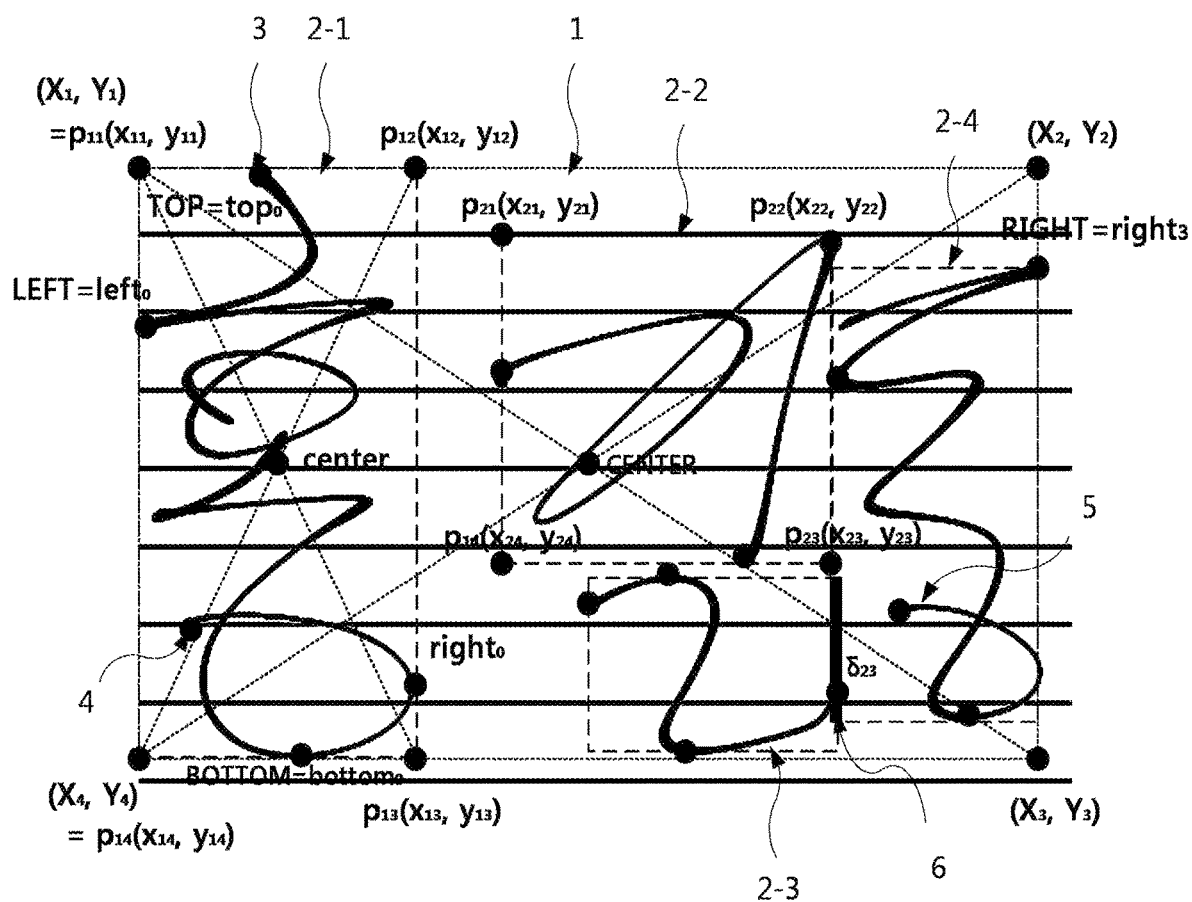
FIG. 3 illustrates a method for generating segment blocks of a handwritten signature and information elements of segment block characteristics according to an exemplary embodiment of the present invention.

FIG. 2 is a diagram illustrating a configuration of a handwritten signature characteristics acquisition unit of a segment-block-based handwritten signature authentication system according to the present invention, and FIG. 3 illustrates a method for generating segment blocks of a handwritten signature and information elements of segment block characteristics according to an exemplary embodiment of the present invention. The configuration and operation of the handwritten signature characteristics acquisition unit 550 will be described more fully below with reference to FIGS. 2 and 3.

The handwritten signature characteristics acquisition unit 550 includes a handwritten signature start detection unit 610, a handwritten signature end detection unit 620, a segment detection unit 630, a segment count unit 640, segment block characteristics detection unit 650, an overall handwritten signature block characteristics detection unit 660, and a segment block correlation detection unit 670.

The handwritten signature start detection unit 610 receives continuous handwritten signature input data from the touch input unit 400 when the user handwrites a signature on the touch input unit 420 of the handwritten signature input unit 400 as shown in FIG. 3.

As the input of handwritten signature input data begins, the handwritten signature start detection unit 610 detects the start point (3) as shown in FIG. 3. The handwritten signature start point (3) is the point where the first handwritten signature segment starts.

The handwritten signature start detection unit 610 outputs handwritten signature start point information and first handwritten signature segment start point information and then sends a handwritten signature start point signal to the segment detection unit 630.

The handwritten signature end detection unit 620 detects the end of a handwritten signature with the final touch data input point, namely Point (5) in FIG. 3, being the end point of the handwritten signature when there is no touch data input for a certain period of time After a handwritten signature start point detection signal is entered from the handwritten signature start detection unit 610, the segment detection unit 630 detects the start and end points of each segment of the handwritten signature disjointed by the signer based on position and pressure data of touch data, which is handwritten signature input data, and sends a handwritten signature segment detection signal to the segment count unit 640 whenever a handwritten signature segment is detected. In FIG. 3, for example, the signer writes the first Korean character '홍' in a single stroke, which means '홍' itself will be the first segment of the handwritten signature. Therefore, the segment detection unit 630 outputs start point and end point information on the start point (3) and end point (4) of the first handwritten signature segment and detects the second segment '길' by detecting its start and end points.

The segment detection unit 630 in FIG. 3 will detect a total of four handwritten signature segments and output a detection signal each time a segment is detected.

Furthermore, the segment detection unit 630 tracks handwritten signature segments, and generates and sends segment images to the segment block characteristics detection unit 650.

The segment count unit 640 counts the number (n) of segments each time a segment detection signal is entered from the segment detection unit 630 and outputs the counted number (n) when a handwritten signature end signal is entered from the handwritten signature end detection unit 620. In FIG. 3, the segment count unit 640 outputs 4 as the number (n) information.

The segment block characteristics detection unit 650 generates a segment block ($s_0$) (2-1) that includes a segment image entered from the segment detection unit 530, generates segment block characteristics information ($v_0$) on the generated segment block, and generates and outputs overall segment block characteristics information (V) when acquiring segment block characteristics information ($v_i$) on all segment of the handwritten signature. The configuration and operation of the segment block characteristics detection unit 650 will be described in more detail below with reference to FIG. 4.

The segment block may be a various types of polygon, such as a rectangle and pentagon, but it is recommended that it be a rectangle as shown in FIG. 3 so as to make it easy to apply the same rule to all segments of a handwritten signature.

A rectangular segment block (2) according to the present invention may be a block that includes the entire segment image with the minimum area possible, formed by lines passing through the top ($top_i$), bottom ($bottom_i$), leftmost ($left_i$), and rightmost ($right_i$) points of the segment image.

The overall handwritten signature block characteristics detection unit 660 generates a handwritten signature image by composing segment images entered from the handwritten signature image acquisition unit 540 or the segment detection unit 630, generates an overall handwritten signature block (S) that includes the entire handwritten signature image generated, and generates and outputs overall handwritten signature characteristics information (Q) on the overall handwritten signature block generated. The overall handwritten signature characteristics information (Q) includes space area information ($SPACE_S$) and position data $\{(X_1, Y_1), (X_2, Y_2), (X_3, Y_3), (X_4, Y_4)\}$ on each edge of the overall handwritten signature block (S), as shown in Equation 2 below.

$$Q=\{(X_1,Y_1),(X_2,Y_2),(X_3,Y_3),(X_4,Y_4)\}U\{SPACE_S\} \quad \text{[Equation 2]}$$

The segment block correlation detection unit 670 receives segment block characteristics information ($v_i$) from the segment block characteristics detection unit 650 and space information ($SPACE_S$) on the handwritten signature block (1) from the overall handwritten signature block characteristics detection unit 660, and generates and outputs block correlation characteristics information (C) that includes correlation information between each segment block ($s_i$) and one or more of its adjacent segment blocks ($s_j$) and between each segment block and the overall handwritten signature block.

The handwritten signature block characteristics information generation unit 680 receives overall segment block characteristics information (V) from the segment block characteristics detection unit 650, overall handwritten signature block characteristics information (Q) from the overall handwritten signature block characteristics detection unit 660, and block correlation characteristics information (C) from the segment block correlation detection unit 670, and generates and outputs handwritten signature characteristics information (Σ) that includes the overall segment block characteristics information (V), overall handwritten signature block characteristics information (Q), and block correlation characteristics information (C).

Figure 4:
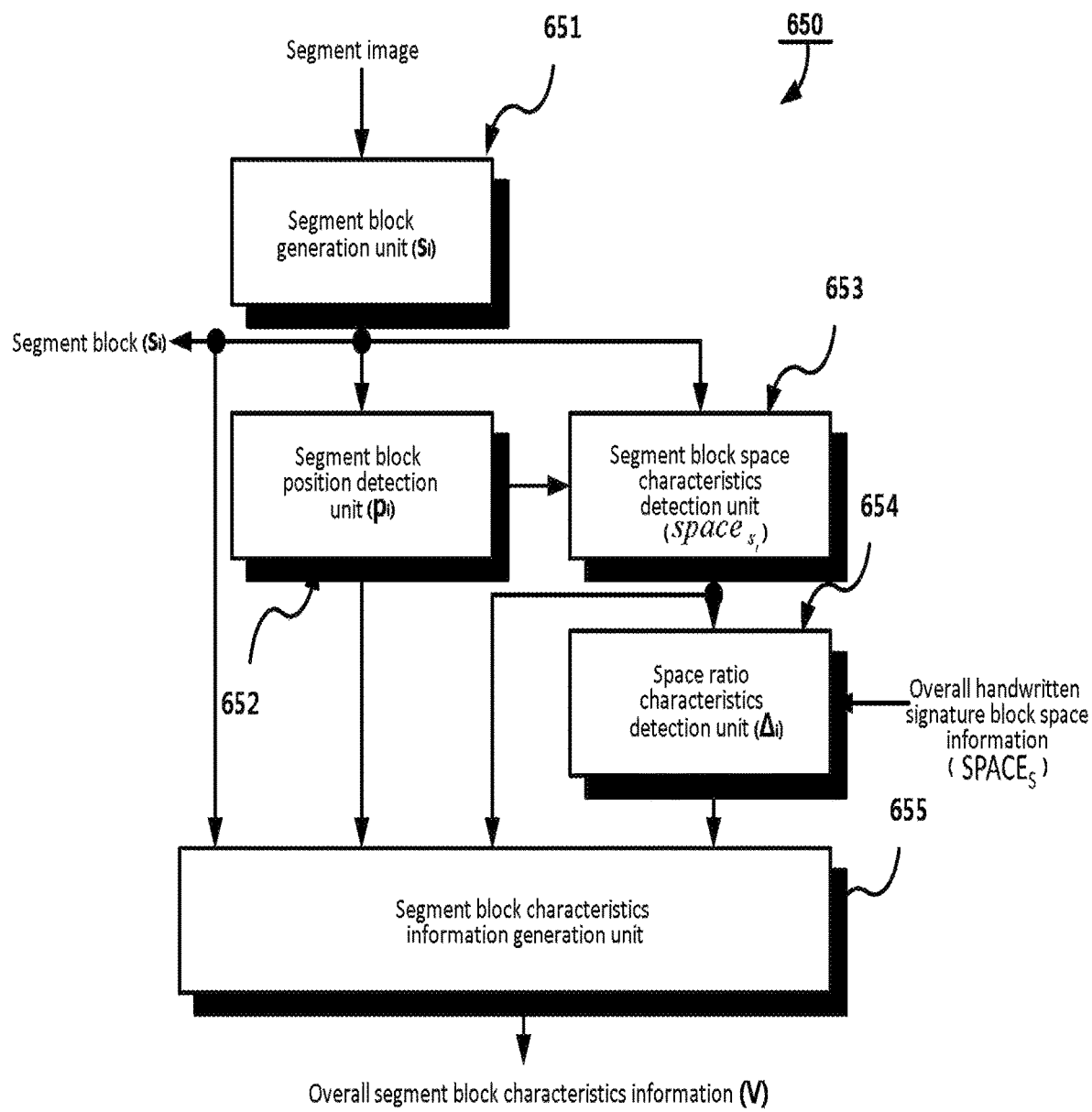
FIG. 4 illustrates a configuration of a segment block characteristics detection unit of a handwritten signature characteristics acquisition unit according to the present invention.

FIG. 4 is a diagram illustrating a configuration of a segment block characteristics detection unit of a handwritten signature characteristics acquisition unit according to the present invention.

The segment block characteristics detection unit 650 includes a segment block generation unit 651, a segment block position detection unit 652, a segment block space characteristics detection unit 653, a space ratio characteristics detection unit 654, and a segment block characteristics information generation unit 655.

The segment block generation unit 651 generates and sends a segment block ($s_i$) that includes a segment image to the segment block position detection unit 652, segment block space characteristics detection unit 653, and segment block characteristics information generation unit 655.

The segment block position detection unit 652 receives segment blocks ($s_i$) from the segment block generation unit 651 and outputs segment block position information ($p_i$) on each edge of the segment block ($s_i$). The segment block position information ($p_i$) can be described as shown in Equation 3 below when the block is rectangular.

$$p_i=\{p_{i1}(x_{i1},y_{i1}),p_{i2}(x_{i2},y_{i2}),p_{i3}(x_{i3},y_{i3}),p_{i4}(x_{i4},y_{i4})\} \quad \text{[Equation 3]}$$

Therefore, overall segment block position information (P) on an overall handwritten signature, namely entire segments, can be described as shown in Equation 4 below.

$$P=\{p_0,p_1,p_2,\ldots,p_{(n-1)}\} \quad \text{[Equation 4]}$$

The segment block space characteristics detection unit 653 calculates the space area of segment blocks ($s_i$) entered from a segment block generation unit 651 and output segment block space information ($space_{s_i}$).

The space ratio characteristics detection unit 654 receives segment block space information ($space_{s_i}$) from the segment block space characteristics detection unit 653 and overall handwritten signature block space information ($SPACE_S$) from the overall handwritten signature block characteristics detection unit 660 and outputs segment block space ratio information ($\Delta_i$) by calculating the ratio of the segment block space to the handwritten signature block space.

The segment block characteristics information generation unit 655 receives segment block position information ($p_i$) from the segment block position detection unit 652, segment block space information ($space_{s_i}$) from the segment block space characteristics detection unit 653, and segment block space ratio information ($\Delta_i$) from the space ratio characteristics detection 654 in order to generate segment block characteristics information ($v_i$), and generates and outputs overall segment block characteristics information (V). after segment block characteristics information ($v_i$) on all segment blocks is generated.

The segment block characteristics information ($v_i$) and overall segment block characteristics information (V) can be described as shown in Equations 5 and 6, respectively.

$$v_i=\{p_i,space_{s_i},\Delta_i\} \quad \text{[Equation 5]}$$

$$V=\{v_0,v_1,v_2,\ldots,v_{(n-1)}\} \quad \text{[Equation 6]}$$

Figure 5:
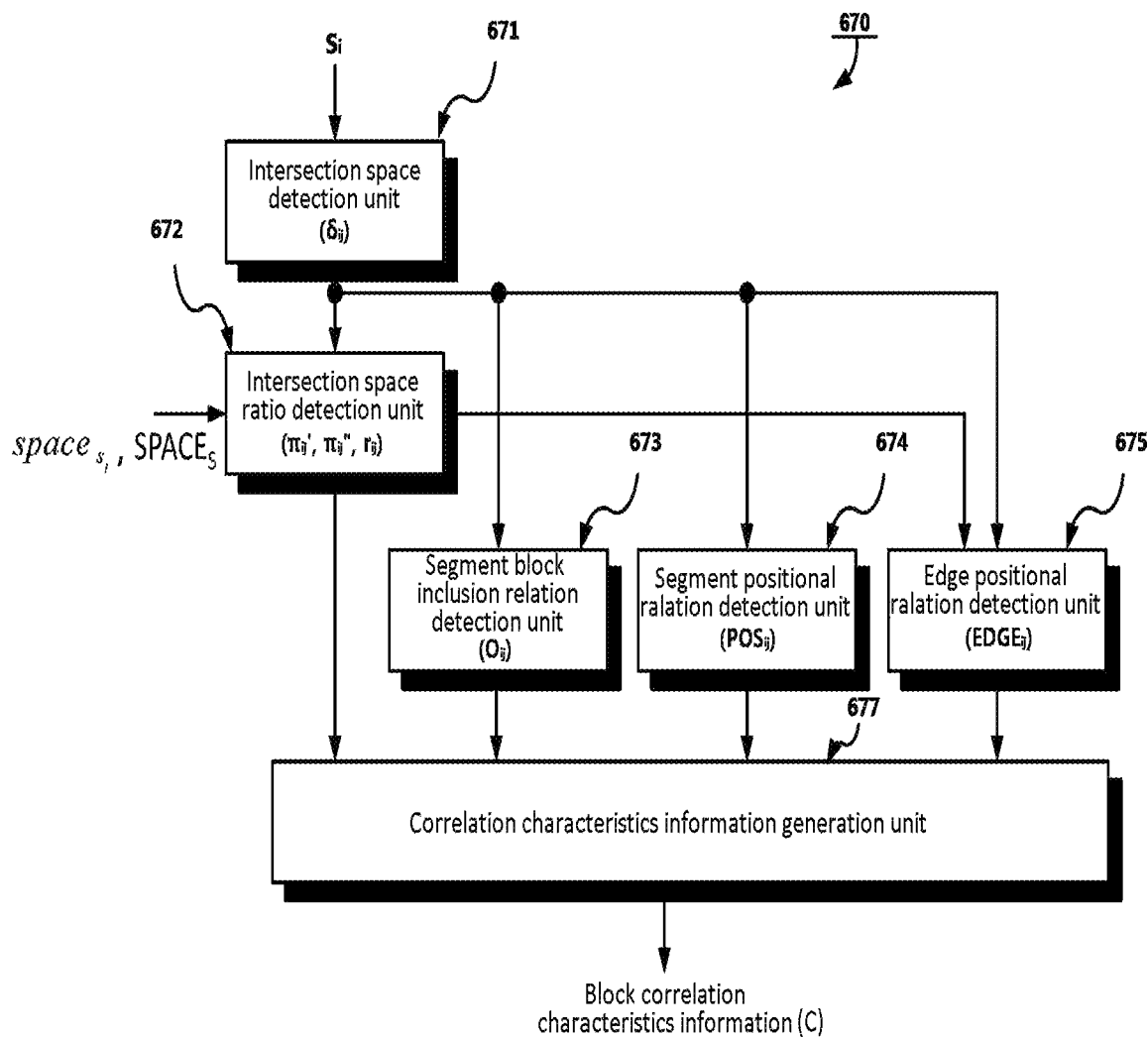
FIG. 5 is a diagram illustrating a detailed configuration of a segment block correlation detection unit of a handwritten signature characteristics acquisition unit according to the present invention.
Figure 6:
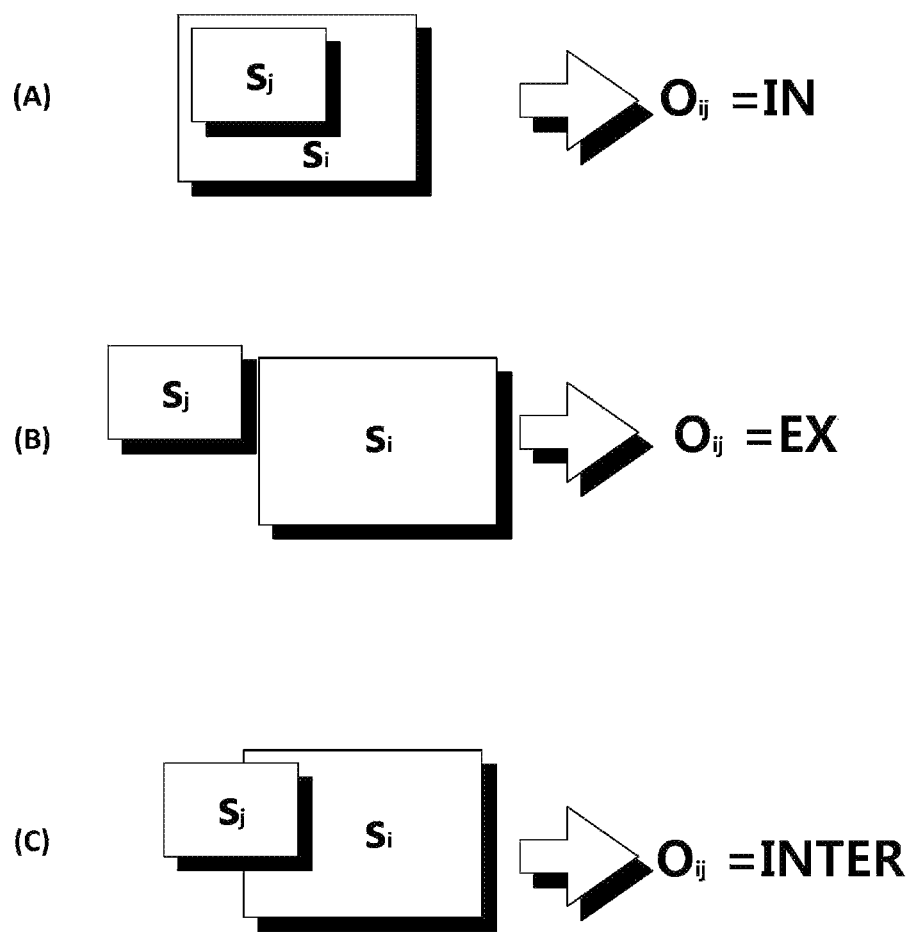
FIG. 6 is a diagram describing a method for generating segment block inclusion relation information, which is one type of information on correlations between segments according to an exemplary embodiment of the present invention.
Figure 7:
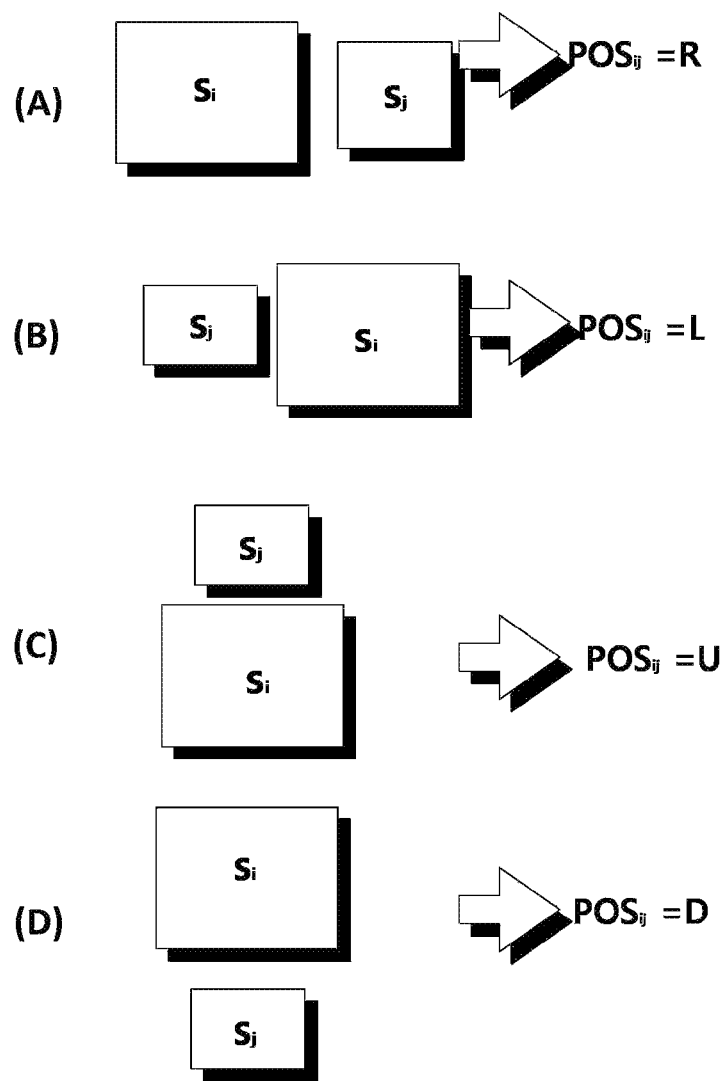
FIG. 7 illustrates a method for generating segment block positional relation information, which is one type of information on correlations between segments according to an exemplary embodiment of the present invention.
Figure 8:
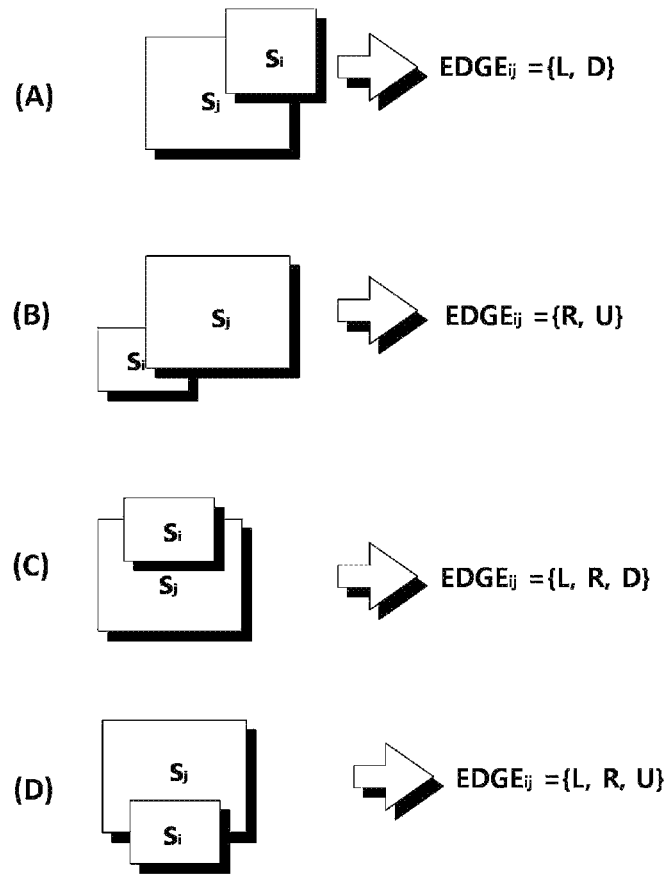
FIG. 8 illustrates a method for generating segment block edge positional relation information, which is one type of information on correlations between segments according to an exemplary embodiment of the present invention.
Figure 9:
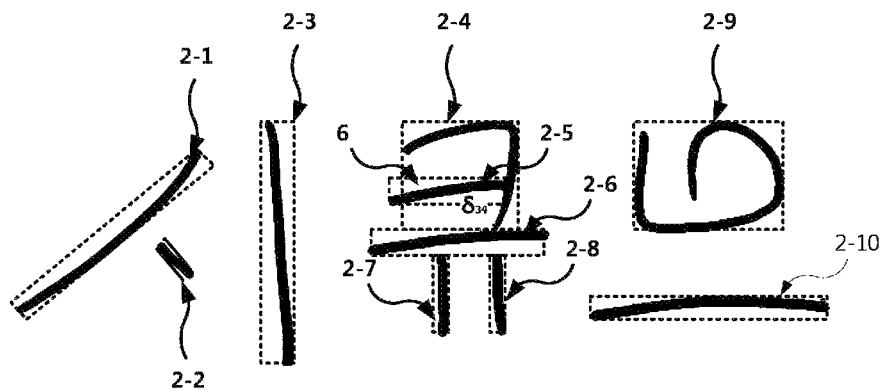
FIG. 9 illustrates an example of a handwritten signature according to an exemplary embodiment of the present invention.

FIG. 5 is a diagram illustrating a detailed configuration of a segment block correlation detection unit of a handwritten signature characteristics acquisition unit according to the present invention, and FIG. 6 is a diagram describing a method for generating segment block inclusion relation information, which is one type of information on correlations between segments according to an exemplary embodiment of the present invention. FIG. 7 illustrates a method for generating segment block positional relation information, which is one type of information on correlations between segments according to an exemplary embodiment of the present invention. FIG. 8 illustrates a method for generating segment block edge positional relation information, which is one type of information on correlations between segments according to an exemplary embodiment of the present invention. FIG. 9 illustrates an example of a handwritten signature according to an exemplary embodiment of the present invention. The following description will be provided with reference to FIGS. 5 through 9.

The segment block correlation detection unit 670 includes an intersection space detection unit 671, an intersection space ratio detection unit 672, a segment block inclusion relation detection unit 673, a segment positional relation detection unit 674, an edge positional relation detection unit 675, and a correlation characteristics information generation unit 677.

The intersection space detection unit 671 receives segment blocks ($s_i$) from the segment block characteristics detection unit, analyzes one or more of adjacent segment block ($s_j$) that intersect with part of a segment block ($s_i$), detects any intersection space, calculates, if any, the intersection space area, and outputs intersection space information ($\delta_{ij}$).

In FIG. 3, for example, the intersection space detection unit 671 detects any intersection space by analyzing adjacent segment blocks (including 2-2, 2-4, or 2-1) ($s_1$, $s_3$, or $s_0$) to the segment block ($s_2$) (2-3). The segment block ($s_2$) intersects with the segment block ($s_3$) that is one of the adjacent segment blocks ($s_1$, $s_3$, and $s_0$), so the intersection space detection unit 671 calculates the area of the intersection space (6) between the segment block ($s_2$) and the adjacent segment block ($s_3$) and outputs intersection space information ($\delta_{23}$).

Furthermore, in FIG. 9, for example, the segment block ($s_3$) (2-4) and an adjacent segment block ($s_4$) (2-5) form intersection space (6). Therefore, the intersection space detection unit 671 generates and outputs intersection space information ($\delta_{34}$) on the intersection space (6).

The intersection space ratio detection unit 672 receives segment block space information (space$_{s_i}$) from the segment block space characteristics detection unit 653 of the segment block characteristics detection unit 650, overall handwritten signature space information (SPACE$_S$) from the overall handwritten signature block characteristics detection unit 660, and intersection space information ($\delta_{ij}$) from the intersection space detection unit 671, and generates and outputs intersection space ratio information. Then using the intersection space ratio information, it calculates and outputs segment block space ratio information ($\pi'_{ij}$), which shows the ratio of intersection space ($\delta_{ij}$) to segment block space (space$_{s_i}$) of a segment block ($s_i$), adjacent segment block space ratio information ($\pi''_{ij}$), which shows the ratio of intersection space ($\delta_{ij}$) to adjacent segment block space (SPACEs$_j$) of an adjacent segment block ($s_j$), and overall handwritten signature block intersection space ratio information ($r_{ij}$), which shows the ratio of intersection space ($\delta_{ij}$) to overall handwritten signature block space (SPACE$_S$) of the overall handwritten signature block (S).

The segment block inclusion relation detection unit 673 detects whether a segment block ($s_i$) is included in an adjacent segment block ($s_j$) and outputs segment block inclusion relation information ($O_{ij}$) based on the result. Segment block inclusion relation information is stored in one of three forms such as inclusion (IN), non-inclusion (exclusion) (EX), and intersection (INTER).

Referring to FIG. 6, the segment block inclusion relation detection unit 673 generates segment block inclusion relation information of inclusion (IN) when an adjacent segment block ($s_j$) is included in a segment block ($s_i$) as shown in (A), segment block inclusion relation information of non-inclusion (EX) when an adjacent segment block ($s_j$) is outside a segment block ($s_i$) as shown in (B), segment block inclusion relation information of intersection (INTER) when an adjacent segment block ($s_j$) intersects with a segment block ($s_i$) as shown in (C).

Referring to FIG. 9, the segment block inclusion relation detection unit 673 will output segment block inclusion relation information of non-inclusion (EX) regarding all segment blocks ($s_i$) and their adjacent segment blocks ($s_j$), except for the segment block ($s_3$) (2-4) or its adjacent segment block ($s_4$) (2-5) and the segment block ($s_4$) (2-5) and its adjacent segment block ($s_3$) (2-4).

In addition, in FIG. 9, the segment block inclusion relation detection unit 673 will output segment block inclusion relation information ($O_{34}$, $O_{43}$) representing intersection (INTER) only between the segment block ($s_3$) (2-4) and its adjacent segment block ($s_4$) (2-5).

The segment positional relation detection unit 674 generates and outputs segment block positional relation information (POS$_{ij}$), which is position information on all adjacent segment blocks ($s_j$) based on a segment block ($s_i$).

In FIG. 7, for example, the segment positional relation detection unit 674 generates and outputs 'R' (which means the right side) as segment block positional relation information (POS$_{ij}$) when an adjacent segment block ($s_j$) is on the right of a segment block ($s_i$) as shown in (A), 'L' (which means the left side) as segment block positional relation information (POS$_{ij}$) when an adjacent segment block ($s_j$) is on the left of a segment block ($s_i$) as shown in (B), and 'U' or 'D' (which means the upside or the downside) as segment block positional relation information (POS$_{ij}$) when an adjacent segment block ($s_j$) is on or under a segment block ($s_i$), respectively as shown in (C) and (D).

The edge positional relation detection unit 675 receives information on whether a segment block ($s_i$) intersects with an adjacent segment block ($s_j$) from the intersection space ratio detection unit 672, and, if they intersect, generates and outputs segment block edge positional relation information (EDGE$_{ij}$) showing at which edge (EDGE) of the segment block ($s_i$) intersects with the adjacent segment block ($s_j$).

Referring to FIG. 8, the edge positional relation detection unit 675 generates and outputs {L, D} as segment block edge positional relation information (EDGE$_{ij}$) when an adjacent segment block ($s_j$) is on the lower left side of a segment block ($s_i$) as shown in (A).

In addition, the edge positional relation detection unit 675 generates and outputs {R, U} as segment block edge positional relation information (EDGE$_{ij}$) when an adjacent segment block ($s_j$) is on the upper right side of a segment block ($s_i$) as shown in (B).

Furthermore, the edge positional relation detection unit 675 generates and outputs {L, R, D} as segment block edge positional relation information (EDGE$_{ij}$) when an adjacent segment block ($s_j$) is in the lower center of a segment block ($s_i$) as shown in (C).

Lastly, the edge positional relation detection unit 675 generates and outputs {L, R, U} as segment block edge positional relation information ($EDGE_{ij}$) when an adjacent segment block ($s_j$) is in the upper center of a segment block ($s_i$) as shown in (D).

The correlation characteristics information generation unit 677 receives intersection space ratio information, segment block inclusion relation information ($O_{ij}$), segment block positional relation information ($POS_{ij}$), and segment block edge positional relation information ($EDGE_{ij}$) entered from the intersection space ratio detection unit 672, segment block inclusion relation detection unit 673, segment positional relation detection unit 674, and edge positional relation detection unit 675, and generates block correlation characteristics information ($c_{ij}$) that includes the above-described information. After generating block correlation characteristics information ($c_{ij}$) on all segment blocks, it generates and outputs overall block correlation characteristics information (C).

The block correlation characteristics information ($c_{ij}$) and overall block correlation characteristics information ($\Sigma$) can be described as shown in Equations 7 and 8 below.

$$c_{ij} = \{\delta_{ij}, \pi'_{ij}, \pi''_{ij}, r_{ij}, O_{ij}, POS_{ij}, EDGE_{ij}\} \quad \text{[Equation 7]}$$

$$C = \{c_{ij} | i=0,1,2,\ldots,(n-1), j=0,1,2,\ldots,(n-1)\} \quad \text{[Equation 8]}$$

Figure 10:
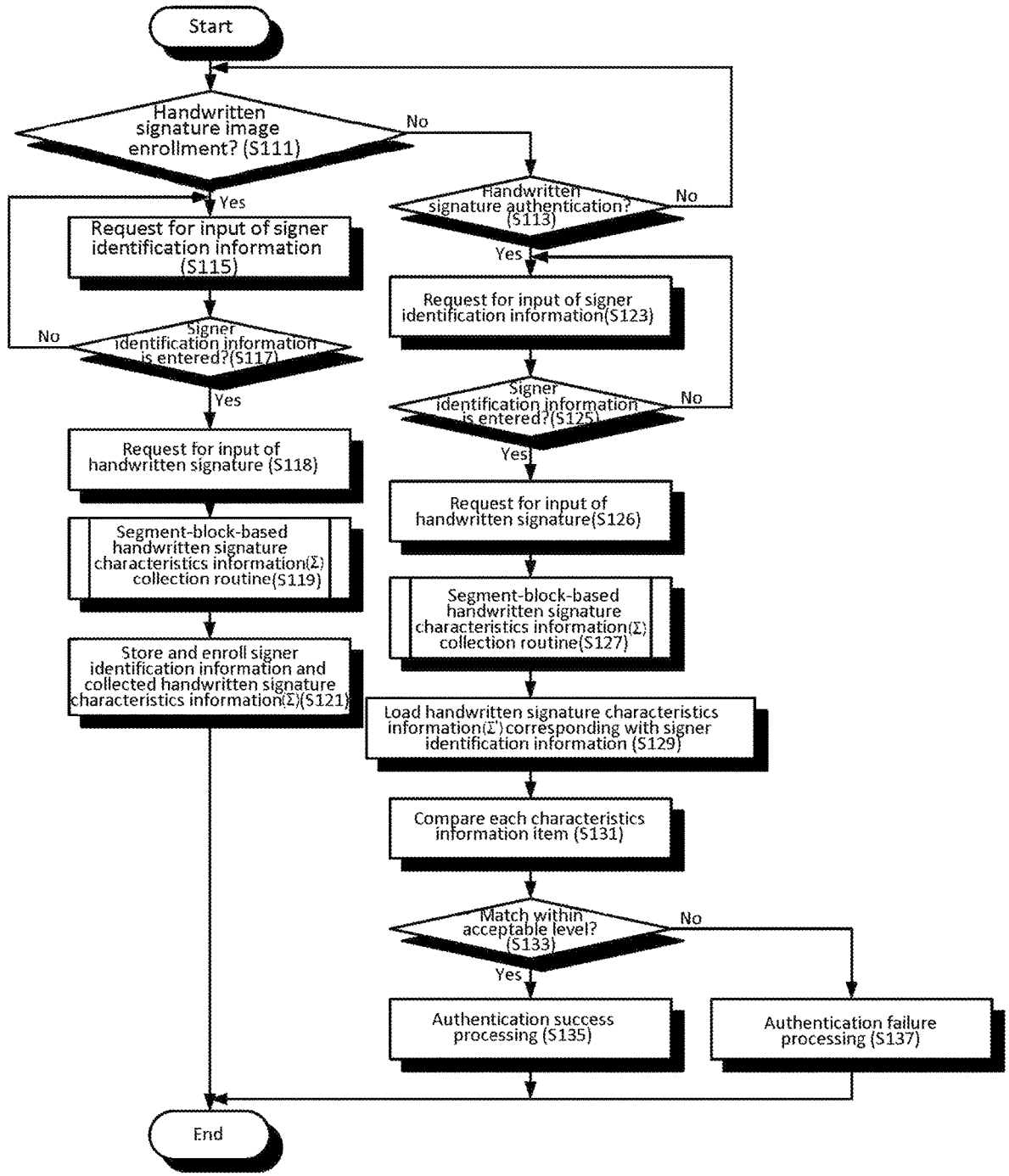
FIG. 10 illustrates a segment-block-based handwritten signature authentication method according to the present invention.

FIG. 10 illustrates a segment-block-based handwritten signature authentication method according to the present invention.

Referring to FIG. 10, a control unit 510 monitors whether handwritten signature enrollment is requested by a command for handwritten signature image enrollment (S111) or whether handwritten signature authentication is requested by a command for handwritten signature authentication (S113) from an input unit 200.

When a handwritten signature enrollment requested is made, the control unit 510 requests the input of the signer's identification information (S115) and monitors whether the signer identification information is entered (S117).

After identification information is entered, the signer is requested to handwrite a signature (S118).

After the request for the handwritten signature, the control unit 510 collects segment-block-based handwritten signature characteristics information ($\Sigma$) by performing a segment-block-based handwritten signature characteristics information collection routine (S119), maps the collected segment-block-based handwritten signature characteristics information ($\Sigma$) to the signer identification information, and stores the collected segment-block-based handwritten signature characteristics information ($\Sigma$) in the enrollment unit 100.

Meanwhile, when a handwritten signature authentication requested is made, the control unit 510 requests the input of signer identification information (S123) and monitors whether user identification information is entered (S125).

After the signer identification information is entered, the control unit 510 requests the input of a handwritten signature through the output unit 300 (S126).

After the request for the handwritten signature, the control unit 510 collects segment-block-based handwritten signature characteristics information ($\Sigma$) by performing a segment-block-based handwritten signature characteristics information collection routine through a handwritten signature characteristics extraction unit 520 (S127) and loads, from the enrollment unit 100, the enrolled handwritten signature characteristics information ($\Sigma'$) that corresponds to the input signer identification information through a handwritten signature segment block authentication unit 560 (S129).

After the enrolled handwritten signature characteristics information ($\Sigma'$) is loaded, the control unit 510 compares the enrolled handwritten signature characteristics information ($\Sigma'$) and the handwritten signature characteristics information ($\Sigma$) through the handwritten signature segment block authentication unit 560 (S131). The control unit 510 may further conduct comparisons between enrolled handwritten signature behavioral characteristics information and collected handwritten signature behavioral characteristics information.

The control unit 510 determines, through the handwritten signature segment block authentication unit 560, whether the match rate for each characteristics item reaches the predetermined match rate (S133) and conducts authentication failure processing if the match rate is below the predetermined match rate (S137). If the match rate is above the predetermined match rate, the control unit 510 conducts authentication success processing (S135).

Figure 11:
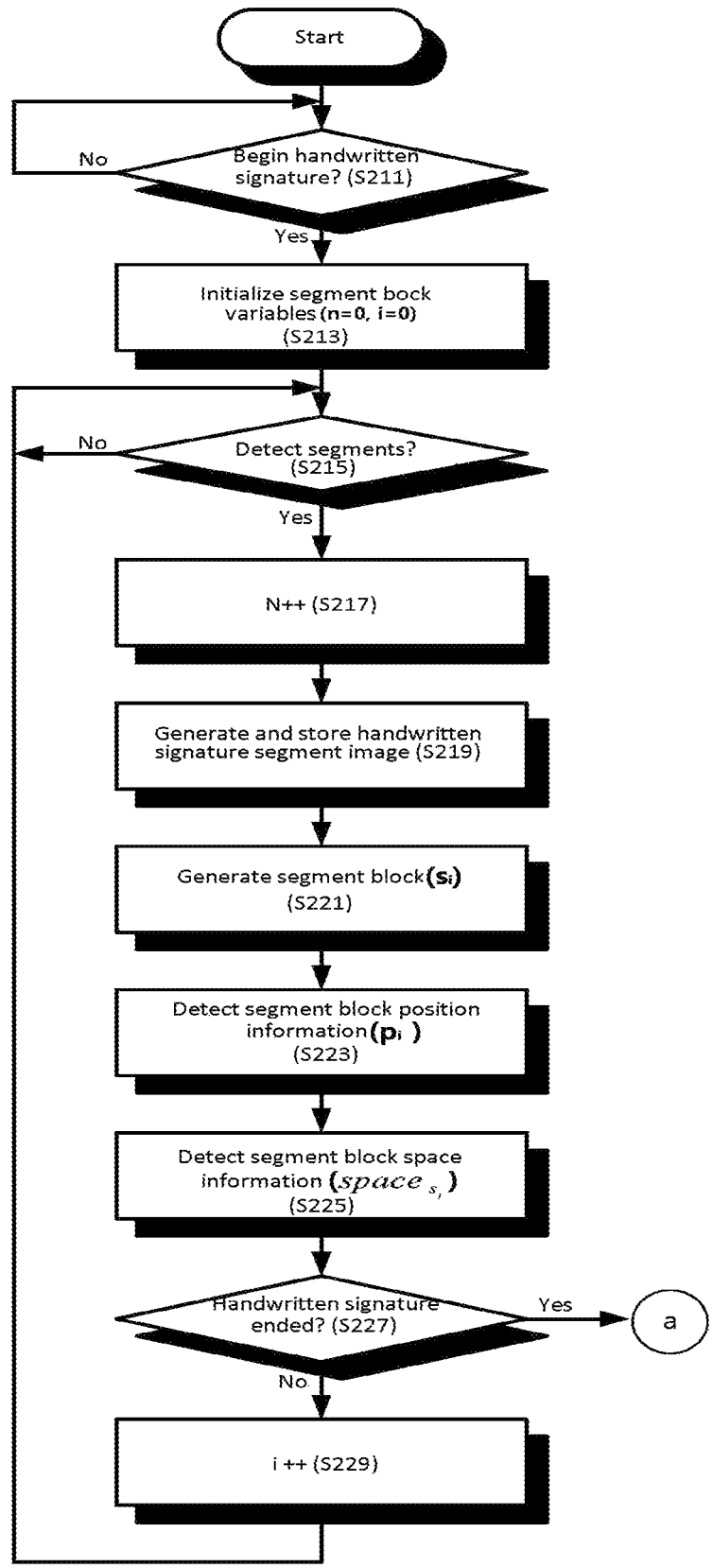
FIGS. 11, 12, and 13 illustrates a method for collecting handwritten signature characteristics data of a segment-block-based handwritten signature authentication method according to the present invention.
Figure 12:
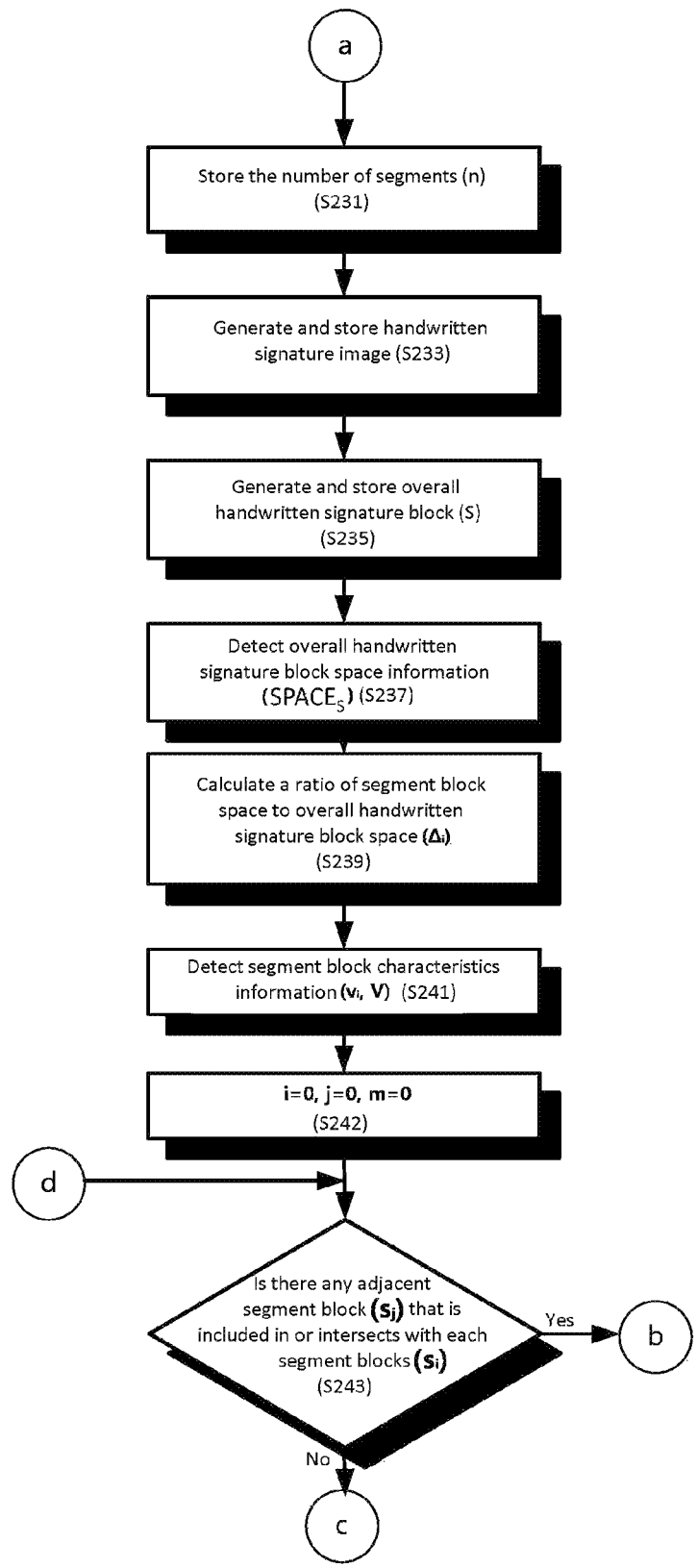
Figure 13:
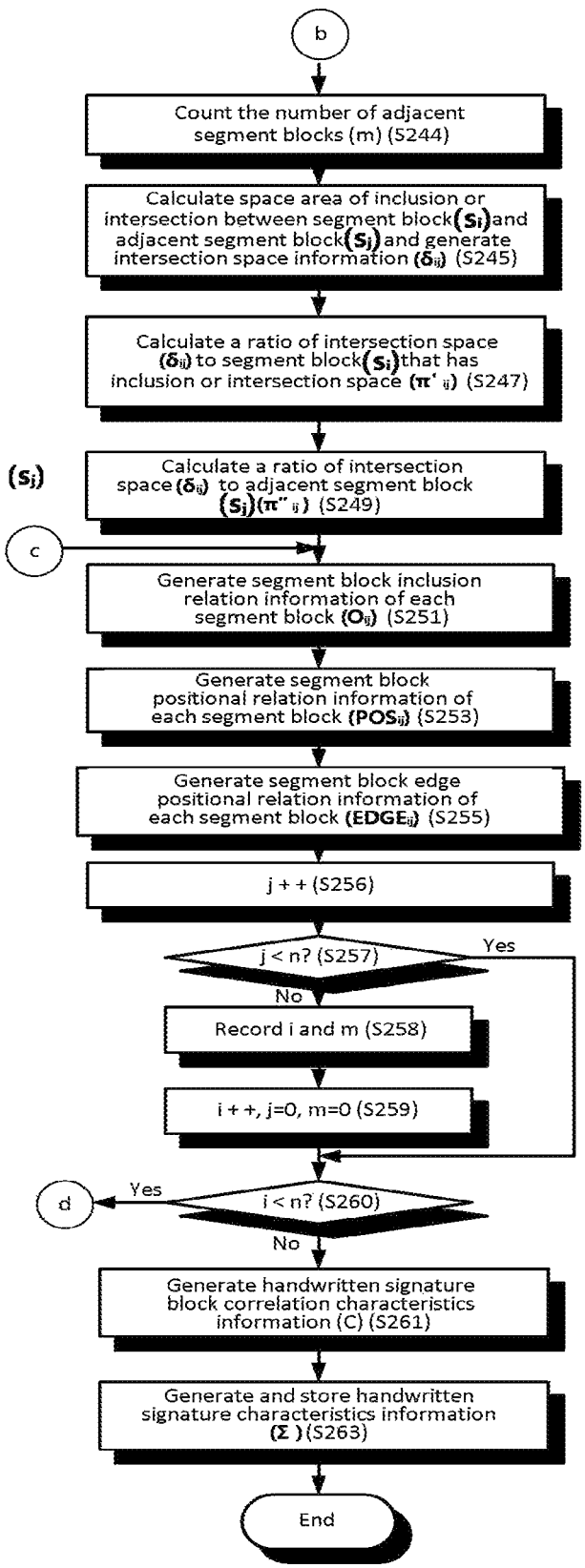

FIGS. 11, 12, and 13 illustrates a method for collecting handwritten signature characteristics data of a segment-block-based handwritten signature authentication method according to the present invention. The method for collecting handwritten signature characteristics information of the segment-block-based handwritten signature authentication method will be described below with reference to FIGS. 11 through 13.

The control unit 510 monitors whether touch data, which is handwritten signature input data, begins to be entered from the touch input unit 420 through one or more of the handwritten signature tracking unit 530, handwritten signature image acquisition unit 540, and handwritten signature characteristics acquisition unit 550 (S211).

When the signer starts handwriting a signature, the control unit 510 initializes segment block variables (n, i) by setting the segment block variables to 0 (n=0, i=0) (S213).

When the segment block variables are initialized, the control unit 510 monitors whether segments are detected (S215).

When segments are detected, the control unit 510 counts the number of the segments (n++) (S217) and generates and stores segment images (S219).

When the segment images are generated, the control unit 510 generates segment blocks ($s_i$) that include the segment images (S221). When generating segment blocks ($s_i$), the same rule should be applied to all segment images as described above.

When the segment blocks ($s_i$) are generated, the control unit 510 detects segment block position information ($p_i$) (S223).

The control unit 510 calculates the space area of each segment block and generates segment block space information ($space_{s_i}$) (S225).

The control unit 510 repeats the above processes until handwriting a signature ends (S227 and S229), thereby generating the segment block position information ($p_i$) and segment block space information ($space_{s_i}$) for all segments (S215 to S229).

When segment block position information ($p_i$) and segment block space information ($space_{s_i}$) on the overall handwritten signature, namely all segments of the handwritten signature, are generated, the control unit 510 stores the number of the segments (n) (S231).

The control unit 510 generates and stores a handwritten signature image (S233) and generates and stores an overall handwritten signature block (S) that includes the generated handwritten signature image (S235).

When the overall handwritten signature block (S) is generated, the control unit 510 calculates the space area of the overall handwritten signature block and generates overall handwritten signature block space information ($SPACE_S$) (S237).

When the overall handwritten signature block space information ($SPACE_S$) is generated, the control unit 510 generates segment block space ratio information ($\Delta_i$) by calculating the ratio of segment block space ($space_{s_i}$) to the overall handwritten signature block space ($SPACE_S$) (S239).

When the segment block space ratio information ($\Delta_i$) is generated, the control unit 510 generates segment block characteristics information ($v_i$) and overall segment block characteristics information (V) (S241).

When the overall segment block characteristics information (V) is generated, the control unit 510 detects any adjacent segment block ($s_j$) that intersects with each of the segment blocks ($s_i$) of the handwritten signature (S243).

If there is any adjacent segment block, the control unit 510 counts the number of the adjacent segment blocks (m) (S244).

If there is any adjacent segment block ($s_j$) intersecting with or included in a segment block ($s_i$), the control unit 510 generates intersection space information ($\delta_{ij}$) by calculating the space area of the included or intersecting space formed by a segment block ($s_i$) and an adjacent segment bock ($s_j$) (S245).

When the intersection space information ($\delta_{ij}$) is generated, the control unit 510 generates segment block intersection space ratio information ($\pi'_{ij}$), which shows the ratio of intersection space ($\delta_{ij}$) to the segment block ($s_i$) space (S247).

Furthermore, the control unit 510 generates adjacent segment block intersection space ratio information ($\pi''_{ij}$), which shows the ratio the intersection space ($\delta_{ij}$) to the space of the intersecting adjacent segment block ($s_j$) (S249).

The control unit 510 generates segment block inclusion relation information ($O_{ij}$), which shows whether an adjacent segment block ($s_j$) is included in or intersects with a segment block ($s_i$), segment block positional relation information ($POS_{ij}$) representing relative position of all adjacent segment blocks ($s_j$) based on a segment block ($s_i$), and segment block edge positional relation information ($EDGE_{ij}$) representing at which edge (EDGE) of a segment block ($s_i$) it intersects with an adjacent segment block ($s_j$) (S251, S253, and S255).

Through S256 to S260, the control unit 510 generates segment block edge positional relation information ($EDGE_{ij}$) on all adjacent segment blocks ($s_j$:j<n) based on each of the segment blocks ($s_i$:i<n).

When the information is generated, the control unit 510 generates block correlation characteristics information (C) (S261) and finally, generates and stores handwritten signature characteristics information ($\Sigma$) that includes all of the above information in the enrollment unit 100 (S263).

Meanwhile, the present invention is not limited to the above-described exemplary embodiments and it may be easily understood by those skilled in the art that various modifications, changes, substitutions or additions may be made without departing from the spirit and scope of the invention. When the practice of such modifications, changes, substitutions or additions are within the scope of the appended claims, the technical idea should also be regarded as belonging to the present invention.

The invention claimed is:

1. A segment-block-based handwritten signature authentication system, the system comprising:
a handwritten signature input unit that includes a touch input unit that outputs touch data, as handwritten signature input data, including position data and pressure data with respect to positions that are touched by a signer for a handwritten signature;
an enrollment unit that enrolls handwritten signature characteristics information of each signer; and
a handwritten signature authentication unit that
generates a handwritten signature image and segment images by identifying the handwritten signature of the signer and recognizing segments disjointed by the signer from the handwritten signature input data entered from the handwritten signature input unit,
generates both a handwritten signature block including the handwritten signature and segment blocks containing the segments,
collects handwritten signature characteristics information ($\Sigma$) including each segment block information, handwritten signature block information, correlation information between the segment blocks, and correlation information between each segment block and the handwritten signature block,
maps the collected handwritten signature characteristics information to identification information of the signer,
enrolls the collected handwritten signature characteristics information in the enrollment unit,
collects handwritten signature characteristics information ($\Sigma$) including correlation information between the segment blocks and correlation information between each segment block and the handwritten signature block from the touch data entered through the touch input unit of the handwritten signature input unit upon request for a handwritten signature authentication,
loads the enrolled handwritten signature characteristics information ($\Sigma'$) that corresponds with the identification information of the signer who requests the handwritten signature authentication, and
performs a segment-block-based handwritten signature authentication according to a match rate by comparing the enrolled handwritten signature characteristics information ($\Sigma'$) with the collected handwritten signature characteristics information ($\Sigma$),
wherein the handwritten signature authentication unit comprises:
a handwritten signature characteristics extraction unit that extracts the handwritten signature characteristics information ($\Sigma$) including overall handwritten signature block characteristics information (Q) which is characteristics information of the handwritten signature block that includes the handwritten signature image, overall segment block characteristics information (V) which is characteristics information on the handwritten signature segments that constitute the handwritten signature, and block correlation characteristics information (C) caused by the correlations between the segment blocks and the correlations between each segment block and the handwritten signature block, from the handwritten signature input data entered from the touch input unit of the handwritten signature input unit;
a handwritten signature segment block authentication unit that performs handwritten signature authentication according to each predetermined match rate by comparing the handwritten signature characteristics information (Σ) extracted from the handwritten signature characteristics extraction unit with the pre-enrolled handwritten signature characteristics information (Σ'); and a control unit that saves and enrolls the handwritten signature characteristics information, as extracted through the handwritten signature characteristics extraction unit, to the enrollment unit at time of request for enrollment, and performs handwritten signature authentication by controlling the handwritten signature segment block authentication unit at time of request for handwritten signature authentication, wherein the handwritten signature characteristics extraction unit comprises;

a handwritten signature start detection unit that detects the start of a handwritten signature from the touch data;

a handwritten signature end detection unit that detects the end of a handwritten signature designating a final touch data input point as an end point of the handwritten signature when there is no touch data input for a certain period of time;

a segment detection unit that detects the segments disjointed by handwriting the signature from the touch data, and generates and outputs segment images of the detected segments;

a segment count unit that counts the number of the segments detected in the segment detection unit;

a segment block characteristics detection unit that receives the segment images as input, creates each segment block ($s_i$) including the corresponding segment image, generates each segment block characteristics information ($v_i$) on the created segment block ($s_i$), and generates and outputs overall segment block characteristics information (V) including all of the generated segment block characteristics information ($v_i$);

an overall handwritten signature block characteristics detection unit that creates a handwritten signature block (S) including the acquired handwritten signature image, and generates and outputs overall handwritten signature block characteristics information (Q) on the handwritten signature block (S);

a segment block correlation detection unit that generates and outputs the block correlation characteristics information (C) according to the correlations between the segment blocks and the correlations between the overall handwritten signature block and each segment block; and a handwritten signature characteristics acquisition unit that includes a handwritten signature block characteristics information generation unit that generates and outputs handwritten signature characteristics information (Σ) including the overall handwritten signature block characteristics information (Q), the overall segment block characteristics information (V), and the block correlation characteristics information (C), wherein the overall handwritten signature block characteristics detection unit further generates and outputs overall handwritten signature block space information ($SPACE_S$) by calculating space area of the handwritten signature block (S), and wherein the segment block characteristics detection unit comprises:

a segment block generation unit that receives the segment images as input, and generates and outputs the segment block ($s_i$) including the corresponding segment image;

a segment block edge position detection unit that receives the segment block ($s_i$) as input, and detects and outputs segment block position information ($p_i$), which is information on all edges of the segment block;

a segment block space characteristics detection unit that receives at least one of the segment block ($s_i$) and the segment block position information ($p_i$), and generates and outputs segment block space information ($space_{s_i}$) by calculating the space area of the segment block ($s_i$);

a space ratio characteristics detection unit that receives the overall handwritten signature block space information ($SPACE_S$) and the segment block space information ($space_{s_i}$) from the overall handwritten signature block characteristics detection unit, and generates and outputs segment block space ratio information ($\Delta_i$) by calculating a ratio of the space area of the segment block against the overall handwritten signature block space; and a segment block characteristics information generation unit that generates, for each segment of handwritten signature, the segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

2. The system of claim 1, wherein the segment block is a polygon and wherein the segment block generation unit generates a polygon segment block surrounding a segment by passing through the top, bottom, leftmost, and rightmost points of the segment.

3. A segment-block-based handwritten signature authentication system, the system comprising:

a handwritten signature input unit that includes a touch input unit that outputs touch data, as handwritten signature input data, including position data and pressure data with respect to positions that are touched by a signer for a handwritten signature;

an enrollment unit that enrolls handwritten signature characteristics information of each signer; and a handwritten signature authentication unit that
generates a handwritten signature image and segment images by identifying the handwritten signature of the signer and recognizing segments disjointed by the signer from the handwritten signature input data entered from the handwritten signature input unit,
generates both a handwritten signature block including the handwritten signature and segment blocks containing the segments,
collects handwritten signature characteristics information (Σ) including each segment block information, handwritten signature block information, correlation information between the segment blocks, and correlation information between each segment block and the handwritten signature block,
maps the collected handwritten signature characteristics information to identification information of the signer, enrolls the collected handwritten signature characteristics information in the enrollment unit, collects handwritten signature characteristics information ($\Sigma$) including correlation information between the segment blocks and correlation information between each segment block and the handwritten signature block from the touch data entered through the touch input unit of the handwritten signature input unit upon request for a handwritten signature authentication, loads the enrolled handwritten signature characteristics information ($\Sigma'$) that corresponds with the identification information of the signer who requests the handwritten signature authentication, and performs a segment-block-based handwritten signature authentication according to a match rate by comparing the enrolled handwritten signature characteristics information ($\Sigma'$) with the collected handwritten signature characteristics information ($\Sigma$), wherein the handwritten signature authentication unit comprises:

a handwritten signature characteristics extraction unit that extracts the handwritten signature characteristics information ($\Sigma$) including overall handwritten signature block characteristics information (Q) which is characteristics information of the handwritten signature block that includes the handwritten signature image, overall segment block characteristics information (V) which is characteristics information on the handwritten signature segments that constitute the handwritten signature, and block correlation characteristics information (C) caused by the correlations between the segment blocks and the correlations between each segment block and the handwritten signature block, from the handwritten signature input data entered from the touch input unit of the handwritten signature input unit;

a handwritten signature segment block authentication unit that performs handwritten signature authentication according to each predetermined match rate by comparing the handwritten signature characteristics information ($\Sigma$) extracted from the handwritten signature characteristics extraction unit with the pre-enrolled handwritten signature characteristics information ($\Sigma'$); and a control unit that saves and enrolls the handwritten signature characteristics information, as extracted through the handwritten signature characteristics extraction unit, to the enrollment unit at time of request for enrollment, and performs handwritten signature authentication by controlling the handwritten signature segment block authentication unit at time of request for handwritten signature authentication, wherein the handwritten signature characteristics extraction unit comprises;

a handwritten signature start detection unit that detects the start of a handwritten signature from the touch data;

a handwritten signature end detection unit that detects the end of a handwritten signature designating a final touch data input point as an end point of the handwritten signature when there is no touch data input for a certain period of time;

a segment detection unit that detects the segments disjointed by handwriting the signature from the touch data, and generates and outputs segment images of the detected segments;

a segment count unit that counts the number of the segments detected in the segment detection unit;

a segment block characteristics detection unit that receives the segment images as input, creates each segment block ($s_i$) including the corresponding segment image, generates each segment block characteristics information ($v_i$) on the created segment block ($s_i$), and generates and outputs overall segment block characteristics information (V) including all of the generated segment block characteristics information ($v_i$);

an overall handwritten signature block characteristics detection unit that creates a handwritten signature block (S) including the acquired handwritten signature image, and generates and outputs overall handwritten signature block characteristics information (Q) on the handwritten signature block (S);

a segment block correlation detection unit that generates and outputs the block correlation characteristics information (C) according to the correlations between the segment blocks and the correlations between the overall handwritten signature block and each segment block; and a handwritten signature characteristics acquisition unit that includes a handwritten signature block characteristics information generation unit that generates and outputs handwritten signature characteristics information ($\Sigma$) including the overall handwritten signature block characteristics information (Q), the overall segment block characteristics information (V), and the block correlation characteristics information (C), wherein the overall handwritten signature block characteristics detection unit further generates and outputs the overall handwritten signature block space information ($SPACE_S$) by calculating space area of the handwritten signature block (S) and wherein the segment block correlation detection unit comprises:

an intersection space detection unit that detects any adjacent segment block ($s_j$) having a relation of inclusion or intersection with each segment block ($s_i$), and outputs, if any, intersection space information ($\delta_{ij}$) by calculating space area of inclusion or intersection;

an intersection space ratio detection unit that
receives the overall handwritten signature block space information ($SPACE_S$), the segment block space information ($space_{s_i}$), and the intersection space information ($\delta_{ij}$) as input,
generates handwritten signature block intersection space ratio information ($r_{ij}$) by calculating a ratio of the intersection space ($\delta_{ij}$) against the overall handwritten signature block space ($SPACE_S$),
generates segment block intersection space ratio information ($\Pi'_{ij}$) by calculating a ratio of the intersection space ($\delta_{ij}$) against the segment block space ($space_{s_i}$), and
generates adjacent segment block intersection space ratio information ($\Pi''_{ij}$) by calculating a ratio of the intersection space ($\delta_{ij}$) against the adjacent segment block space ($SPACE_{Sj}$);

a segment block inclusion relation detection unit that generates and outputs segment block inclusion relation information ($O_{ij}$), which shows whether an adjacent segment block ($s_j$) is included in or intersects with a segment block ($s_i$);

a segment positional relation detection unit that generates and outputs segment block positional relation information ($POS_{ij}$) representing relative position on all adjacent segment blocks ($s_j$) based on a segment block ($s_i$);

an edge positional relation detection unit that generates and outputs segment block edge positional relation information ($EDGE_{ij}$) representing relative edge position at which edge of a segment block ($s_i$) intersects with all adjacent segment blocks ($s_j$); and a correlation characteristics information generation unit that generates and outputs block correlation characteristics information (C) including the intersection space information ($\delta_{ij}$), the handwritten signature block intersection space ratio information ($r_{ij}$), the segment block intersection space ratio information ($\Pi'_{ij}$), the adjacent segment block intersection space ratio information ($\Pi''_{ij}$), the segment block inclusion relation information ($O_{ij}$), the segment block positional relation information ($POS_{ij}$), and the segment block edge positional relation information ($EDGE_{ij}$).

4. A segment-block-based handwritten signature authentication method, comprising:

an enrollment process in which a handwritten signature authentication unit generates a handwritten signature image and segment images by identifying a handwritten signature of a signer and recognizing segments disjointed by the signer from handwritten signature input data entered from a handwritten signature input unit, generates both a handwritten signature block including the handwritten signature and segment blocks containing the segments, collects handwritten signature characteristics information ($\Sigma$) including each segment block information, handwritten signature block information, correlation information between the segment blocks, and correlation information between each segment block and the handwritten signature block, maps the collected handwritten signature characteristics information to identification information of the signer, and enrolls the collected handwritten signature characteristics information in an enrollment unit; and a handwritten signature authentication process in which the handwritten signature authentication unit collects handwritten signature characteristics information ($\Sigma$) including correlation information between the segment blocks and correlation information between each segment block and the handwritten signature block from the touch data entered through a touch input unit of the handwritten signature input unit upon request for handwritten signature authentication, loads the enrolled handwritten signature characteristics information ($\Sigma'$) that corresponds with the identification information of the signer who requests handwritten signature authentication, and performs a handwritten signature authentication according to a match rate by comparing the enrolled handwritten signature characteristics information ($\Sigma'$) with the collected handwritten signature characteristics information ($\Sigma$), wherein the handwritten signature enrollment process comprises:

an enrollment request monitoring step that monitors whether handwritten signature enrollment is made;

a signer identification information acquisition step that acquires the signer identification information to be enrolled upon request for handwritten signature enrollment;

a handwritten signature characteristics information acquisition step that acquires the handwritten signature characteristics information ($\Sigma$) from touch data entered through the touch input unit regarding to the handwritten signature of the signer; and a handwritten signature enrollment step that maps the handwritten signature characteristics information to the identification information of the signer and enrolls the handwritten signature characteristics information in the enrollment unit, wherein the handwritten signature characteristics information ($\Sigma$) acquisition step comprises:

a handwritten signature tracking step that begins tracking the handwritten signature from the touch data of the handwritten signature input data entered from the handwritten signature input unit;

a segment detection step that detects handwritten signature segments disjointed by the signer from the touch data through a segment detection unit, and generates and outputs segment images of the detected segments when the handwritten signature tracking step begins;

a segment count step that counts the number of the segments detected from the segment detection unit;

a segment block characteristics detection step that receives the segment image as input, creates each segment block ($s_i$) including the corresponding segment image, and generates and outputs each segment block characteristics information ($v_i$) on the created segment block ($s_i$);

an overall handwritten signature block characteristics detection step that creates a handwritten signature block (S) including the acquired handwritten signature image, and generates and outputs overall handwritten signature block characteristics information (Q) on the handwritten signature block (S);

a segment block correlation detection step that generates and outputs block correlation characteristics information (C) according to the correlations between the segment blocks and the correlations between the overall handwritten signature block and each segment block; and a handwritten signature block characteristics information generation step that generates overall segment block characteristics information (V) including segment block characteristics information ($v_i$) on all segments, and generates and outputs handwritten signature characteristics information ($\Sigma$) including the overall handwritten signature block characteristics information (Q), the overall segment block characteristics information (V), and the block correlation characteristics information (C), wherein the overall handwritten signature block characteristics detection step further generates and outputs overall handwritten signature block space information ($SPACE_S$) by calculating space area of the handwritten signature block (S), and wherein the segment block characteristics detection step comprises:

a segment block generation step that receives the segment images as input, and generates and outputs the segment block ($s_i$) including the corresponding segment image;

a segment block edge position detection step that receives the segment block ($s_i$) as input, and detects and outputs segment block position information ($p_i$), which is position information on all edges of the segment block;

a segment block space characteristics detection step that receives at least one of the segment block ($s_i$) and the segment block position information ($p_i$), and generates and outputs segment block space information ($space_{s_i}$) by calculating the space area of the segment block ($s_i$);

a space ratio characteristics detection step that receives the segment block space information ($space_{s_i}$) the overall handwritten signature block space information ($SPACE_S$) detected from an overall handwritten signature block characteristics detection unit, and generates and outputs segment block space ratio information ($\Delta_i$) by calculating a ratio of the space area of the segment block ($space_{s_i}$) against the overall handwritten signature block space ($SPACE_S$); and a segment block characteristics information generation step that generates, for each segment of handwritten signature, segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

5. The method of claim 4, wherein the handwritten signature authentication process comprises:

a handwritten signature authentication request monitoring step that monitors whether handwritten signature authentication is made;

a signer identification information acquisition step that acquires the signer identification information upon request for handwritten signature authentication;

a handwritten signature characteristics information acquisition step that acquires the handwritten signature characteristics information ($\Sigma$) from touch data entered from the touch input unit regarding to the handwritten signature of the signer;

an enrolled handwritten signature characteristics information loading step that loads the pre-enrolled handwritten signature characteristics information ($\Sigma'$) corresponding with the acquired signer identification information; and a handwritten signature authentication step that performs handwritten signature authentication by comparing the acquired handwritten signature characteristics information ($\Sigma$) with the enrolled handwritten signature characteristics information ($\Sigma'$) as loaded and outputs a result of the authentication.

6. The method of claim 4, wherein the segment block is a polygon, and wherein a segment block generation unit, in the segment block generation step, generates a polygon segment block surrounding a segment by passing through the top, bottom, leftmost, and rightmost points of the segment.

7. A segment-block-based handwritten signature authentication method, comprising:

an enrollment process in which a handwritten signature authentication unit generates a handwritten signature image and segment images by identifying a handwritten signature of a signer and recognizing segments disjointed by the signer from handwritten signature input data entered from a handwritten signature input unit, generates both a handwritten signature block including the handwritten signature and segment blocks containing the segments, collects handwritten signature characteristics information ($\Sigma$) including each segment block information, handwritten signature block information, correlation information between the segment blocks, and correlation information between each segment block and the handwritten signature block, maps the collected handwritten signature characteristics information to identification information of the signer, and enrolls the collected handwritten signature characteristics information in an enrollment unit; and a handwritten signature authentication process in which the handwritten signature authentication unit;

collects handwritten signature characteristics information ($\Sigma$) including correlation information between the segment blocks and correlation information between each segment block and the handwritten signature block from the touch data entered through a touch input unit of the handwritten signature input unit upon request for handwritten signature authentication, loads the enrolled handwritten signature characteristics information ($\Sigma'$) that corresponds with the identification information of the signer who requests handwritten signature authentication, and performs a handwritten signature authentication according to a match rate by comparing the enrolled handwritten signature characteristics information ($\Sigma'$) with the collected handwritten signature characteristics information ($\Sigma$), wherein the handwritten signature enrollment process comprises:

an enrollment request monitoring step that monitors whether handwritten signature enrollment is made;

a signer identification information acquisition step that acquires the signer identification information to be enrolled upon request for handwritten signature enrollment;

a handwritten signature characteristics information acquisition step that acquires the handwritten signature characteristics information ($\Sigma$) from touch data entered through the touch input unit regarding to the handwritten signature of the signer; and a handwritten signature enrollment step that maps the handwritten signature characteristics information to the identification information of the signer and enrolls the handwritten signature characteristics information in the enrollment unit, wherein the handwritten signature characteristics information ($\Sigma$) acquisition step comprises:

a handwritten signature tracking step that begins tracking the handwritten signature from the touch data of the handwritten signature input data entered from the handwritten signature input unit;

a segment detection step that detects handwritten signature segments disjointed by the signer from the touch data through a segment detection unit, and generates and outputs segment images of the detected segments when the handwritten signature tracking step begins;

a segment count step that counts the number of the segments detected from the segment detection unit;

a segment block characteristics detection step that receives the segment image as input, creates each segment block ($s_i$) including the corresponding segment image, and generates and outputs each segment block characteristics information ($v_i$) on the created segment block ($s_i$);

an overall handwritten signature block characteristics detection step that creates a handwritten signature block (S) including the acquired handwritten signature image, and generates and outputs overall handwritten signature block characteristics information (Q) on the handwritten signature block (S);

a segment block correlation detection step that generates and outputs block correlation characteristics information (C) according to the correlations between the segment blocks and the correlations between the overall handwritten signature block and each segment block; and a handwritten signature block characteristics information generation step that generates overall segment block characteristics information (V) including segment block characteristics information ($v_i$) on all segments, and generates and outputs handwritten signature characteristics information ($\Sigma$) including the overall handwritten signature block characteristics information (Q), the overall segment block characteristics information (V), and the block correlation characteristics information (C), wherein the overall handwritten signature block characteristics detection step further generates and outputs the overall handwritten signature block space information ($SPACE_S$) by calculating space area of the handwritten signature block (S), and wherein the segment block correlation detection step comprises:

an intersection space detection step that detects any adjacent segment block ($s_j$) having a relation of inclusion or intersection with each segment block ($s_i$), and outputs, if any, intersection space information ($\delta_{ij}$) by calculating space area of inclusion or intersection;

an intersection space ratio detection step that receives the overall handwritten signature block space information ($SPACE_S$), the segment block space information ($space_{s_i}$), and the intersection space information ($\delta_{ij}$) as input, generates handwritten signature block intersection space ratio information ($r_{ij}$) by calculating a ratio of the intersection space ($\delta_{ij}$) against the overall handwritten signature block space ($SPACE_S$), generates segment block intersection space ratio information ($\Pi'_{ij}$) by calculating a ratio of the intersection space ($\delta_{ij}$) against the segment block space ($space_{s_i}$), and generates adjacent segment block intersection space ratio information ($\Pi''_{ij}$) by calculating a ratio of the intersection space ($\delta_{ij}$) against the adjacent segment block space ($SPACE_{Sj}$);

a segment block inclusion relation detection step that generates and outputs segment block inclusion relation information ($O_{ij}$), which shows whether an adjacent segment block ($s_j$) is included in or intersects with a segment block ($s_i$);

a segment positional relation detection step that generates and outputs segment block positional relation information ($POS_{ij}$), representing relative position on all adjacent segment blocks ($s_j$) based on a segment block ($s_i$);

an edge positional relation detection step that generates and outputs segment block edge positional relation information ($EDGE_{ij}$) representing relative edge position at which edge of a segment block ($s_i$) intersects with all adjacent segment block ($s_j$); and a correlation characteristics information generation step that generates and outputs block correlation characteristics information (C) including the intersection space information ($\delta_{ij}$), the handwritten signature block intersection space ratio information ($r_{ij}$), the segment block intersection space ratio information ($\Pi'_{ij}$), the adjacent segment block intersection space ratio information ($\Pi''_{ij}$), the segment block inclusion relation information ($O_{ij}$), the segment block positional relation information ($POS_{ij}$), and the segment block edge positional relation information ($EDGE_{ij}$).

\* \* \* \* \*